(12) United States Patent
Ogawa et al.

(10) Patent No.: US 10,903,711 B2
(45) Date of Patent: Jan. 26, 2021

(54) MOTOR

(71) Applicant: Nidec Corporation, Kyoto (JP)

(72) Inventors: Kosuke Ogawa, Kyoto (JP); Takashi Hattori, Kyoto (JP); Shunsuke Murakami, Kyoto (JP); Takao Atarashi, Kyoto (JP); Hidehiro Haga, Kyoto (JP); Yoshiaki Yamashita, Kyoto (JP); Takahiro Kizu, Kyoto (JP); Toshiya Okamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 219 days.

(21) Appl. No.: 15/750,858

(22) PCT Filed: Aug. 9, 2016

(86) PCT No.: PCT/JP2016/073479
§ 371 (c)(1),
(2) Date: Feb. 7, 2018

(87) PCT Pub. No.: WO2017/026491
PCT Pub. Date: Feb. 16, 2017

(65) Prior Publication Data
US 2018/0233984 A1 Aug. 16, 2018

(30) Foreign Application Priority Data

Aug. 10, 2015 (JP) .................................. 2015-158390
Mar. 30, 2016 (JP) .................................. 2016-068371

(51) Int. Cl.
*H02K 3/52* (2006.01)
*H02K 3/38* (2006.01)
(Continued)

(52) U.S. Cl.
CPC ................. *H02K 3/50* (2013.01); *H02K 3/38* (2013.01); *H02K 3/52* (2013.01); *H02K 3/522* (2013.01);
(Continued)

(58) Field of Classification Search
CPC .......... H02K 1/14; H02K 1/146; H02K 1/148; H02K 1/16; H02K 1/165; H02K 3/12;
(Continued)

(56) References Cited

U.S. PATENT DOCUMENTS 8,089,183 B2   1/2012   Schwaiger
8,384,257 B2   2/2013   Kinugawa et al.
(Continued)

FOREIGN PATENT DOCUMENTS

JP   2013102596 A   *   5/2013
JP   2014-138499 A     7/2014
(Continued)

OTHER PUBLICATIONS

Hamada, Machine Translation of WO2015083478, Jun. 2015 (Year: 2015).*

(Continued)

*Primary Examiner* — Quyen P Leung
*Assistant Examiner* — Eric Johnson
(74) *Attorney, Agent, or Firm* — Keating & Bennett

(57) ABSTRACT

A motor includes a rotor that has a shaft with a central axis extending in a vertical direction as a center, a stator disposed so as to face the rotor in a radial direction, a bearing that supports the shaft, a wire support member disposed above the stator, and a bearing holder disposed above the wire support member to hold the bearing. The stator includes a plurality of teeth, and a plurality of coils provided on the plurality of teeth. The wire support member includes a wire holding portion that holds one portion of coil lead wires (Continued)

among the coil lead wires drawn out from the coil, a conducting member that electrically connects the other portion of the coil lead wires to each other, and a main body portion that supports the wire holding portion and the conducting member.

15 Claims, 19 Drawing Sheets

(51) Int. Cl.
*H02K 5/16* (2006.01)
*H02K 7/08* (2006.01)
*H02K 3/50* (2006.01)
*H02K 5/173* (2006.01)

(52) U.S. Cl.
CPC .......... *H02K 5/161* (2013.01); *H02K 5/1732* (2013.01); *H02K 7/083* (2013.01); *H02K 2203/06* (2013.01); *H02K 2203/09* (2013.01)

(58) Field of Classification Search
CPC .. H02K 3/28; H02K 3/38; H02K 3/46; H02K 3/50; H02K 3/52; H02K 3/521; H02K 3/522; H02K 5/161; H02K 5/173; H02K 5/1732; H02K 7/083; H02K 2203/06; H02K 2203/09
USPC .......................................................... 310/71
See application file for complete search history.

(56) References Cited

U.S. PATENT DOCUMENTS

| | | | |
|---|---|---|---|
| 9,601,958 | B2 | 3/2017 | Yamaguchi et al. |
| 2007/0182265 | A1* | 8/2007 | Makino .................. H02K 3/522 |
| | | | 310/179 |
| 2009/0256438 | A1* | 10/2009 | Ikeda ..................... H02K 3/522 |
| | | | 310/71 |
| 2010/0327678 | A1 | 12/2010 | Yamasaki et al. |
| 2011/0181221 | A1* | 7/2011 | Asahi ..................... G01D 5/145 |
| | | | 318/400.39 |
| 2012/0229005 | A1 | 9/2012 | Tominaga et al. |
| 2012/0319512 | A1* | 12/2012 | Nakagawa ............. H02K 1/278 |
| | | | 310/71 |
| 2014/0125173 | A1 | 5/2014 | Hayashi |
| 2015/0008803 | A1 | 1/2015 | Furukawa et al. |
| 2015/0357878 | A1* | 12/2015 | Fukunaga ................ H02K 3/50 |
| | | | 310/71 |
| 2016/0181885 | A1* | 6/2016 | Yamasaki .............. H02K 11/33 |
| | | | 180/443 |
| 2016/0276895 | A1* | 9/2016 | Aizawa .................. H02K 3/522 |
| 2018/0183290 | A1* | 6/2018 | Wust ..................... H02K 3/522 |
| 2018/0316239 | A1* | 11/2018 | Ogawa .................. H02K 11/30 |

FOREIGN PATENT DOCUMENTS

| | | | |
|---|---|---|---|
| JP | 2014-158409 A | 8/2014 | |
| KR | 1998-013882 A | 5/1998 | |
| WO | WO-2014112301 A1 * | 7/2014 | ............... H02K 3/28 |
| WO | WO-2015083478 A1 * | 6/2015 | |

OTHER PUBLICATIONS

Sakiyama, Machine Translation of JP2013102596,May 2013 (Year: 2013).*

Official Communication issued in International Patent Application No. PCT/JP2016/073479, dated Oct. 11, 2016.

Ogawa et al. "Motor", U.S. Appl. No. 15/750,850, filed Feb. 7, 2018.

* cited by examiner

MOTOR

BACKGROUND OF THE INVENTION

1. Field of the Invention

The present disclosure relates to a motor.

2. Description of the Related Art

In a motor in the related art, a coil lead wire is drawn out from a stator. The coil lead wire is connected to a control device, a bus bar unit or the like (for example, refer to Japanese Unexamined Patent Application Publication No. 2011-010409 and Japanese Unexamined Patent Application Publication No. 2011-200022). Examples of coils of the stator include a power supply coil and a neutral point coil. The power supply coil is connected to an external control device. The neutral point coil is connected to another neutral point coil. In such a connection structure, the coil lead wire needs to be drawn to a connection destination while ensuring electrical insulation from a peripheral member.

SUMMARY OF THE INVENTION

According to an aspect of the present disclosure, a motor includes a rotor that has a shaft with a central axis extending in a vertical direction as a center, a stator disposed so as to face the rotor in a radial direction, a bearing that supports the shaft, a wire support member disposed above the stator, and a bearing holder disposed above the wire support member to hold the bearing, in which the stator includes a plurality of teeth, and a plurality of coils provided on the plurality of teeth, the wire support member includes a wire holding portion that holds one portion of coil lead wires among the coil lead wires drawn out from the coil, a conducting member that electrically connects the other portion of the coil lead wires to each other, and a main body portion that supports the wire holding portion and the conducting member, and the bearing holder includes a through-hole that penetrates the bearing holder in an axial direction, and a coil end of the coil lead wire passes through the through-hole to extend upward the bearing holder.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

Hereinafter, embodiments of the present disclosure will be described with reference to the drawings.

In the following description, the direction where a central axis J extends is a vertical direction. However, the vertical direction in this specification is simply a name used for description, and does not limit an actual positional relationship, a direction or the like of a motor. In addition, unless otherwise noted, a direction parallel to the central axis J is simply referred to as "axial direction", a radial direction with the central axis J as a center is simply referred to as "radial direction", and a circumferential direction with the central axis J as a center (around axis of the central axis J) is simply referred to as "circumferential direction".

In the present specification, the fact of "extending in the axial direction" includes not only a case of strictly extending in the axial direction, but also a case of extending in a direction inclined in the range of less than 45° with respect to the axial direction. In addition, in the present specification, the fact of "extending in the radial direction" includes not only a case of strictly extending in the radial direction, that is, in the direction perpendicular to the axial direction, but also a case of extending in a direction inclined in the range of less than 45° with respect to the radial direction.

Figure 1:
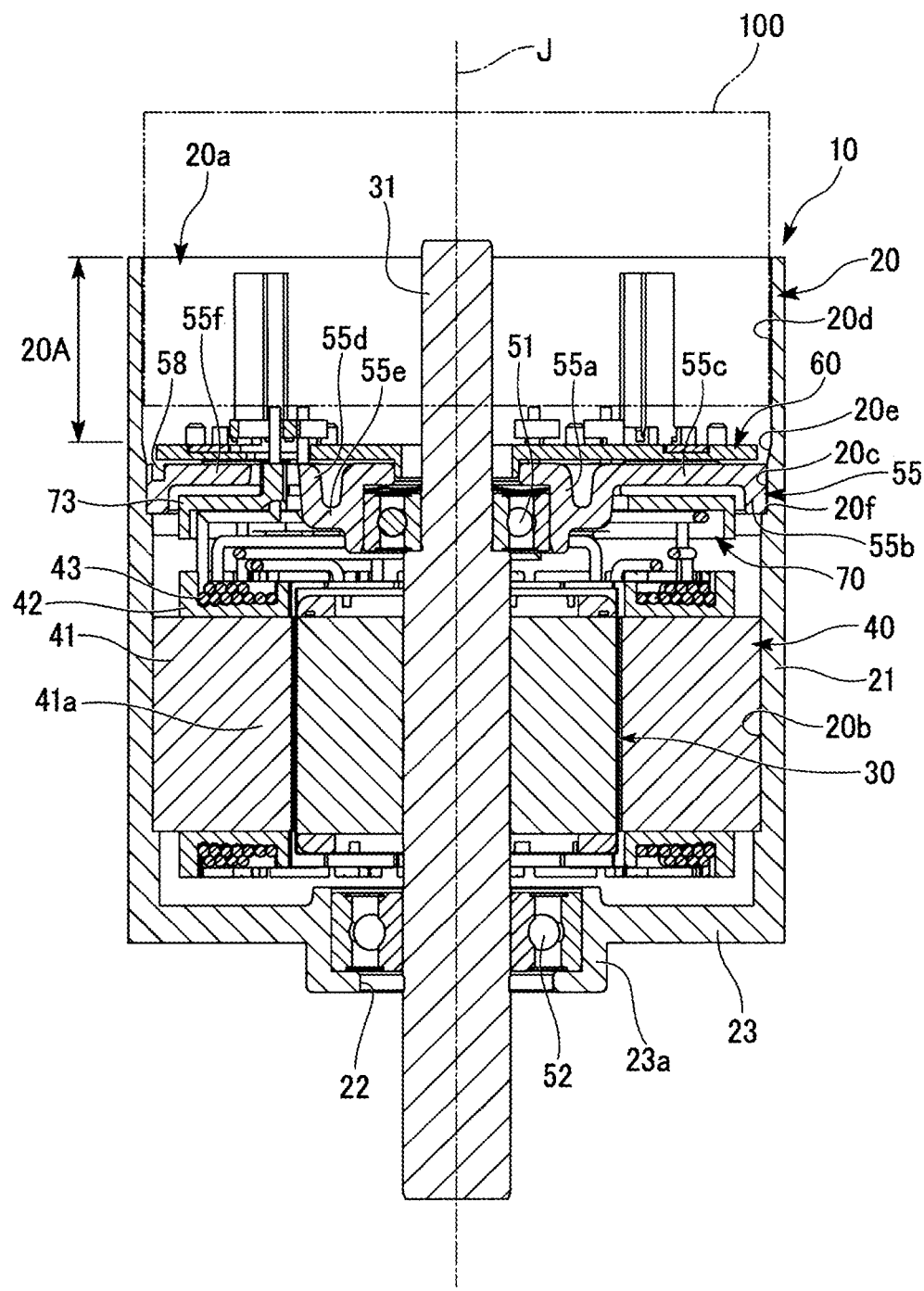
FIG. 1 is a cross-sectional view illustrating a motor according to a preferred embodiment.
Figure 2:
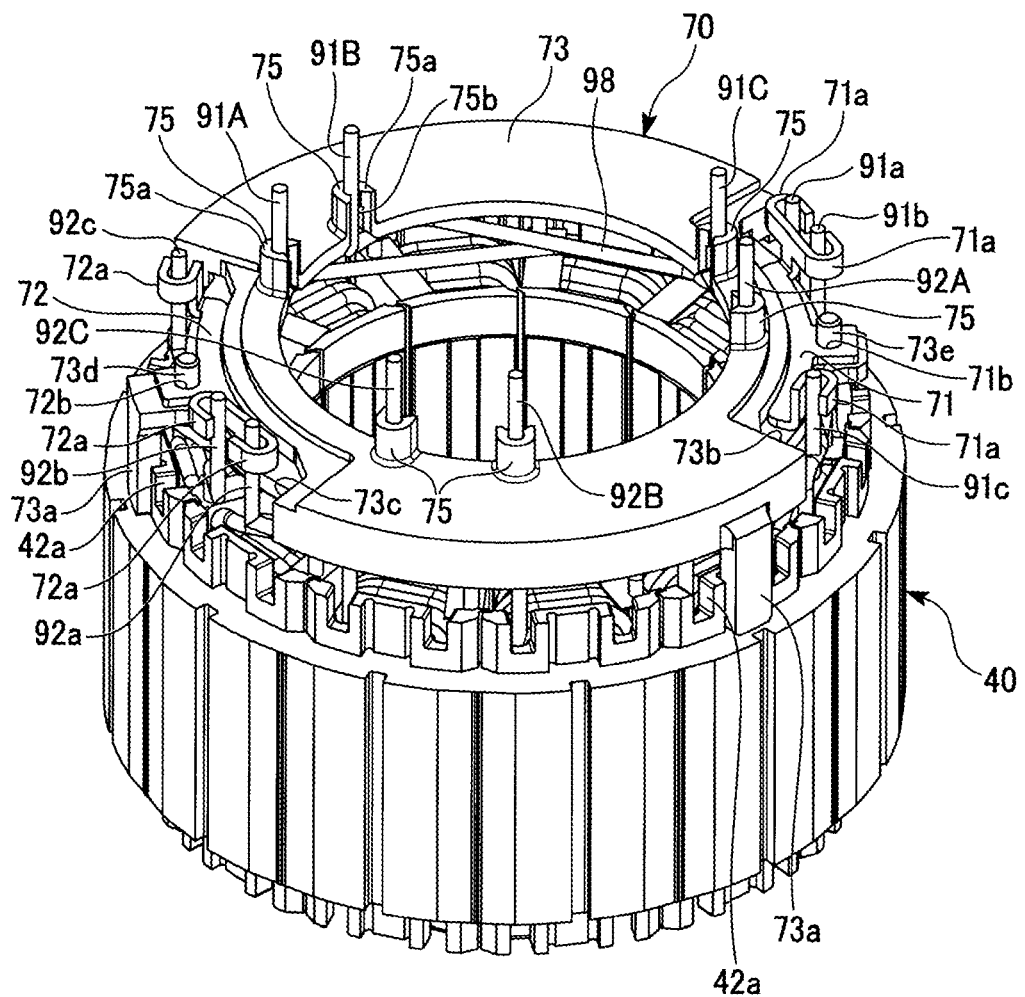
FIG. 2 is a perspective view illustrating a wire support member and a stator in the motor of FIG. 1.
Figure 3:
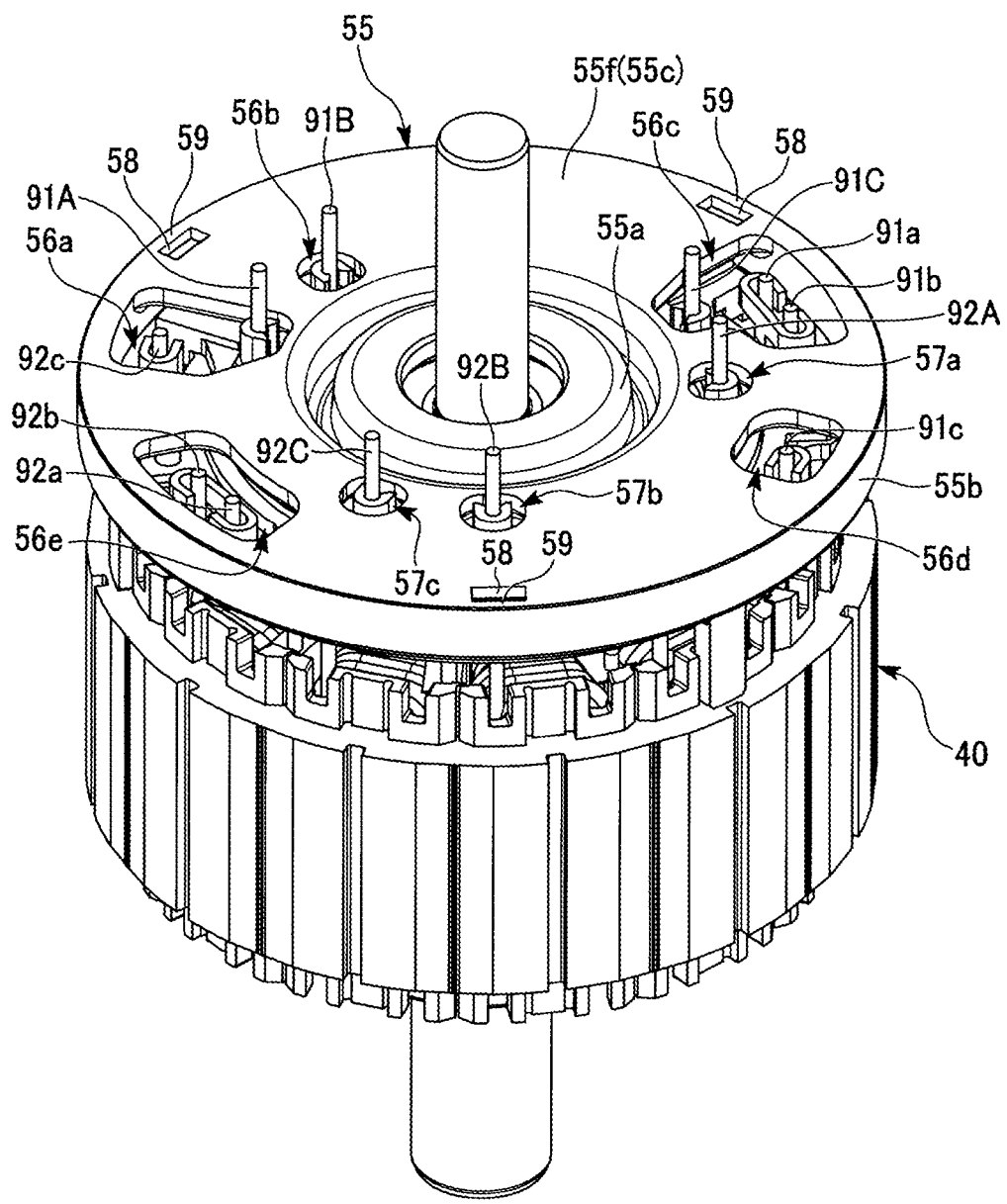
FIG. 3 is a perspective view illustrating a bearing holder and a stator unit in the motor of FIG. 1.
Figure 4:
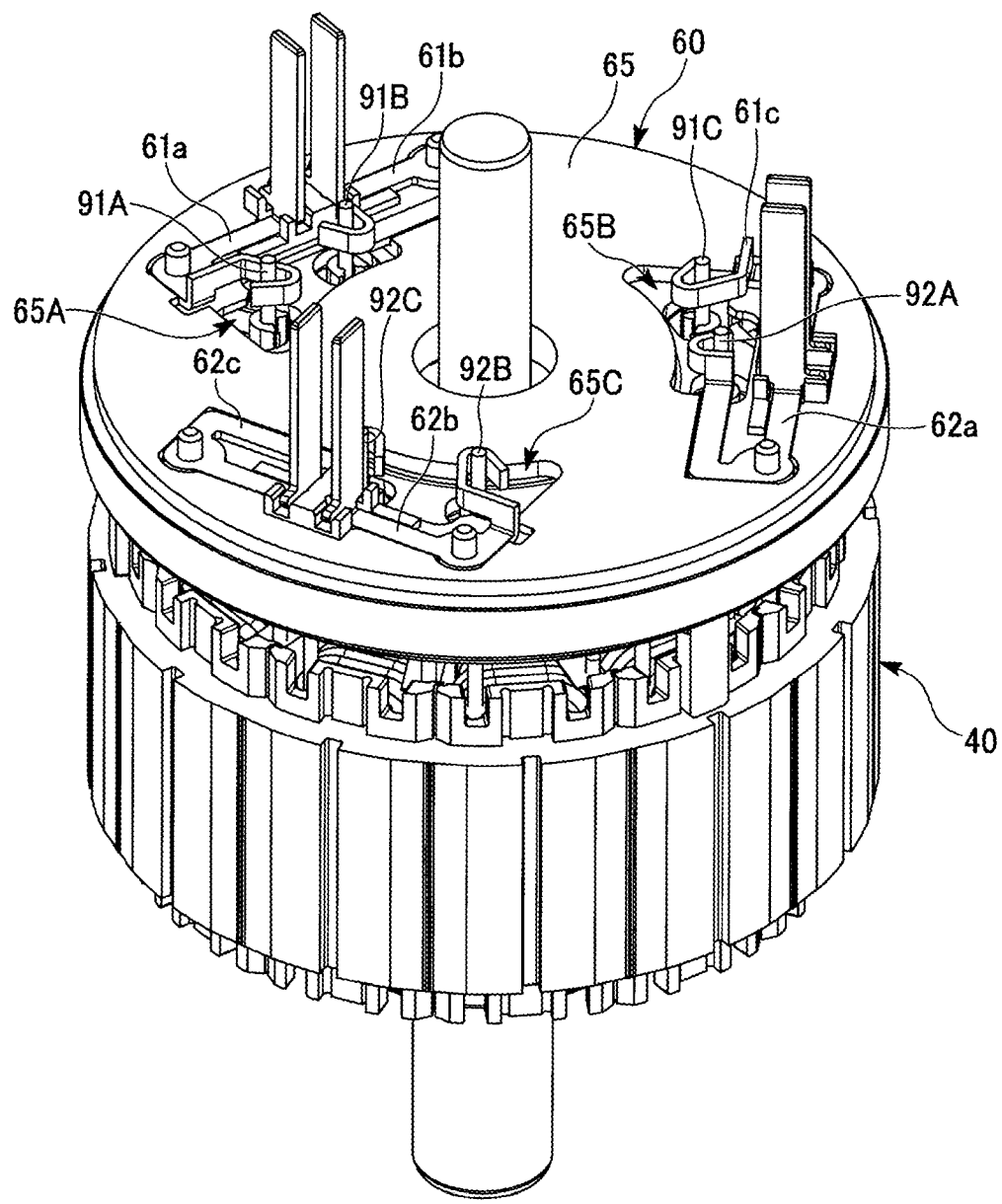
FIG. 4 is a perspective view illustrating a bus bar unit and the stator unit in the motor of FIG. 1.

FIG. 1 is a cross-sectional view illustrating a motor 10 according to a preferred embodiment. FIG. 2 is a perspective view illustrating a wire support member and a stator. FIG. 3 is a perspective view illustrating a bearing holder and a stator unit. FIG. 4 is a perspective view illustrating a bus bar unit and the stator unit.

The motor 10 is provided with a housing 20, a rotor 30, a stator 40, a wire support member 70, a bearing holder 55, a bearing, and a bus bar unit 60. The bearing includes an upper bearing 51 and a lower bearing 52. In the motor 10, the bus bar unit 60, the bearing holder 55, the wire support member 70, and the stator 40 are disposed in this order downward from an upper side. The motor 10 has a control device accommodating region 20A capable of accommodating at least a portion of a control device 100 above the bus bar unit 60. In the preferred embodiment, the motor 10 is a three-phase motor having U-phase, V-phase, and W-phase.

The housing 20 has a cylindrical portion 21 extending in the vertical direction, a bottom wall portion 23 positioned at the lower end of the cylindrical portion 21, and an opening portion 20a opening upward. To the inner surface of the housing 20, the stator 40 and the bearing holder 55 are fixed in order from the lower side.

The cylindrical portion 21 has a cylindrical shape with the central axis J as a center. The cylindrical portion 21 has an inner peripheral surface 20b that holds the stator 40, an inner peripheral surface 20c that holds the bearing holder 55, and an inner peripheral surface 20d of the control device accommodating region 20A that accommodates a portion of the control device 100. The inner diameter of the inner peripheral surface 20d is larger than the inner diameter of the inner peripheral surface 20c. The inner diameter of the inner peripheral surface 20c is larger than the inner diameter of the inner peripheral surface 20b. That is, the housing 20 has an inner surface shape in which the inner diameter decreases rearward from the opening portion 20a (bottom wall portion 23 side).

The inner diameter of the inner peripheral surface 20c is different from the inner diameter of the inner peripheral surface 20d. The housing 20 has an inclined surface 20e that connects the inner peripheral surface 20c and the inner peripheral surface 20d to each other. In the surface shape of the inclined surface 20e, the inner diameter decreases downward in the axial direction. That is, the distance in the radial direction between the central axis J and the inclined surface 20e gradually decreases downward in the axial direction. The cross-sectional shape of the inclined surface 20e is preferably linear or curved. As a result, an operator or the like (such as a motor assembling operator and an assembling device) can smoothly dispose the bearing holder 55 inserted from the opening portion 20a to an attachment position on the inner peripheral surface 20c.

The housing 20 may not necessarily have the inclined surface 20e. For example, in the housing 20, the inner peripheral surface 20c and the inner peripheral surface 20d may be connected to each other in the axial direction via a step portion.

The housing 20 has a shelf surface 20f. The shelf surface 20f is disposed between the inner peripheral surface 20b and the inner peripheral surface 20c and extends in the circumferential direction so as to face the opening portion 20a. The shelf surface 20f is a receiving surface that supports the bearing holder 55 in the axial direction. With this configuration, the housing 20 can hold the bearing holder 55 at a predetermined position with high accuracy in the axial direction.

The shape of the cylindrical portion 21 is not limited to the cylindrical shape. When the inner peripheral surface of the cylindrical portion 21 has a shape capable of holding the stator 40 and the bearing holder 55, the outer shape of the cylindrical portion 21 may be a box shape, for example. In addition, the outer shape of the cylindrical portion 21 may be a combination of a cylindrical shape and a box shape. The stator 40 or the bearing holder 55 may be held by a portion of the inner surface of the cylindrical portion 21 in the circumferential direction.

The bottom wall portion 23 is disposed below the stator 40. The bottom wall portion 23 has a bearing holding portion 23a and an output shaft hole 22. The bearing holding portion 23a holds the lower bearing 52. The output shaft hole 22 penetrates the bottom wall portion 23 in the axial direction.

The rotor 30 has a shaft 31. The shaft 31 extends along a central axis J extending in the vertical direction. The rotor 30 rotates in the circumferential direction about the central axis J together with the shaft 31 as a center. The end portion below the shaft 31 protrudes downward the housing 20 via the output shaft hole 22.

The upper bearing 51 and the lower bearing 52 support the shaft 31 so as to be rotatable around the central axis J. The bearing holding portion 23a holds the lower bearing 52 below the stator 40. The bearing holder 55 holds the upper bearing 51 above the stator 40.

The stator 40 is positioned outward the rotor 30 in the radial direction. The stator 40 has a stator core 41, an insulator 42, and a coil 43. The stator core 41 has an annular shape with the central axis J as a center. The stator core 41 has a plurality of teeth 41a. The insulator 42 is attached to the teeth 41a. The coil 43 is configured to include a conductor wound around the insulator 42. The coil 43 is disposed on each of the teeth 41a. The outer peripheral surface of the stator 40 is fixed to the inner peripheral surface 20b of the housing 20.

As illustrated in FIGS. 1 and 2, the wire support member 70 includes a first conducting member 71, a second conducting member 72, a plurality of wire holding portions 75, and a main body portion 73. In the preferred embodiment, the number of wire holding portions is six. The wire support member 70 is disposed on the stator 40. A neutral point of the coil is connected to the first conducting member 71 and the second conducting member 72. In the following description, the first conducting member 71 is referred to as a first neutral point bus bar 71, and the second conducting member 72 is referred to as a second neutral point bus bar 72.

The main body portion 73 is annular and disposed above the stator 40. The main body portion 73 has a plurality of leg portions 73a extending downward in the axial direction. By fitting the leg portion 73a into a mounting groove 42a of the insulator 42, the wire support member 70 is supported on the stator 40. The main body portion 73 is formed of an insulating material such as resin.

The wire holding portion 75 is disposed on the inner peripheral edge of the main body portion 73. The wire holding portion 75 has a support wall portion 75a and a recessed portion 75b. The support wall portion 75a protrudes upward from the main body portion 73. The recessed portion 75b opens inward the support wall portion 75a in the radial direction. Two of the six wire holding portions 75 are disposed in three positions at every 120° in the circumferential direction. The wire holding portion 75 can be disposed on the outer peripheral edge of the main body portion 73. The arrangement, the number of the wire holding portions 75, and the like can be appropriately changed in consideration of the number of coil lead wires to be described later, a lead out position of the coil lead wire, and the like.

The main body portion 73 has cutout portions 73b and 73c having a fan-shaped outer shape in plan view. The cutout portions 73b and 73c are disposed at two positions on the outer peripheral portion of the main body portion 73. Each of the first neutral point bus bar 71 and the second neutral point bus bar 72 has three U-shaped connection terminals 71a and 72a and one through-hole 71b and 72b. The first neutral point bus bar 71 and the second neutral point bus bar 72 are disposed on the outer peripheral side of the main body portion 73 from the wire holding portion 75. When viewed from the axial direction, the first neutral point bus bar 71 and the second neutral point bus bar 72 are exposed from the cutout portions 73b and 73c. The main body portion 73 has protrusion portions 73d and 73e protruding in the axial direction. The protrusion portions 73d and 73e are disposed on the outer peripheral side of the main body portion 73. The positions in the circumferential direction of the protrusion portions 73d and 73e are the same as the positions in the circumferential direction of the cutout portions 73b and 73c. The protrusion portions 73d and 73e are fitted into the through-holes 71b and 72b of the first neutral point bus bar 71 and the second neutral point bus bar 72 and thereafter heated and melted and solidified. As a result, the first neutral point bus bar 71 and the second neutral point bus bar 72 are fixed to the main body portion 73. The first neutral point bus bar 71 and the second neutral point bus bar 72 may be disposed on the inner peripheral portion of the main body portion 73 together with the cutout portions 73b and 73c.

The stator 40 has twelve coil lead wires 91A to 91C, 91a to 91c, 92A to 92C, and 92a to 92c extending from the plurality of coils 43. The coil lead wires 91A to 91C, 92A to 92C are drawn out above the stator 40 and bent upward in the axial direction from the recessed portion 75b of the wire holding portion 75 as a starting point, and are held by the wire holding portion 75. The width in the circumferential direction of the opening portion inward the recessed portion 75b in the radial direction is smaller than the wire diameter of the coil 43. The inner diameter of the portion outward the recessed portion 75b in the radial direction is substantially the same as the wire diameter of the coil 43. Therefore, when the coil lead wires 91A to 91C and 92A to 92C are pushed rearward from the opening portion of the recessed portion 75b, the opening portion expands due to elastic deformation, and the opening portion returns to the original position after the coil lead wires 91A to 91C and 92A to 92C are accommodated in the recessed portion 75b. In this manner, the coil 43 is held by the wire holding portion 75. The coil lead wires 91A to 91C and 92A to 92C held by the wire holding portion 75 protrude upward in the axial direction from the recessed portion 75b. The coil 43 has certain rigidity. Therefore, the coil lead wires 91A to 91C, 92A to 92C protruding from the wire holding portion 75 do not collapse or deviate greatly.

The coil lead wires 91a to 91c are connected to the connection terminal 71a of the first neutral point bus bar 71. The coil lead wires 92a to 92c are connected to the connection terminal 72a of the second neutral point bus bar 72.

The coil lead wires 91A to 91C are wirings for power supply of each phase (U phase, V phase, and W phase). The coil lead wires 91a to 91c are wirings for neutral point connection corresponding to the coil lead wires 91A to 91C. The coil lead wires 92A to 92C are wirings for power supply of each phase. The coil lead wires 92a to 92c are wirings for neutral point connection corresponding to the coil lead wires 92A to 92C.

An insulating tube 98 as an insulating member is attached to the coil lead wire drawn out from the coil 43. The insulating tube 98 electrically insulates the coil lead wires 91A to 91C, 91a to 91c, 92A to 92C, 92a to 92c extending along the lower surface of the wire support member 70, the coil lead wires 91A to 91C, 91a to 91c, 92A to 92C, 92a to 92c, and the coil 43, respectively. The coil lead wire drawn out from the coil 43 may be electrically insulated by an insulating member or the like other than the insulating tube 98.

The bearing holder 55 has a substantially disk shape and is disposed above the stator 40. The bearing holder 55 holds the upper bearing 51. The bearing holder 55 is held on the inner peripheral surface 20c of the housing 20 by interference fitting. In the preferred embodiment, the bearing holder 55 is fixed to the inner peripheral surface 20b by shrink fitting. The shrink fitting is a fitting method included in the interference fitting. The bearing holder 55 may be fixed to the inner peripheral surface 20b of the housing 20 by other methods such as press fitting.

As a result, without using a fixing member such as a C ring, the bearing holder 55 can be fixed to the housing 20, and the number of parts of the motor 10 can be reduced. In a case where the bearing holder 55 is fixed to the housing 20 using the C ring, it is necessary to provide a groove that holds the C ring on the inner peripheral surface 20b of the housing 20. However, according to the above configuration, it is not necessary to provide the groove, so that the thickness of the housing 20 can be reduced. As a result, it is possible to reduce the outer diameter of the housing 20 while maintaining the inner diameter necessary in order to hold the stator 40 and the bearing holder 55 and the like. Therefore, it is possible to reduce the size of the motor 10.

As illustrated in FIGS. 1 and 3, the bearing holder 55 has an inner cylindrical portion 55a, an outer cylindrical portion 55b, and a connecting portion 55c. The inner cylindrical portion 55a holds the upper bearing 51. The outer cylindrical portion 55b is fitted to the inner cylindrical portion 55a and the inner peripheral surface 20b of the housing 20. The connecting portion 55c connects the inner cylindrical portion 55a and the outer cylindrical portion 55b to each other.

The connecting portion 55c has an intermediate cylindrical portion 55d, an inner connecting portion 55e, and an outer connecting portion 55f. The intermediate cylindrical portion 55d has a cylindrical shape and is positioned between the inner cylindrical portion 55a and the outer cylindrical portion 55b. In plan view, the shape of the inner connecting portion 55e is annular. The inner connecting portion 55e connects the lower end of the intermediate cylindrical portion 55d and the outer peripheral surface of the inner cylindrical portion 55a to each other. In plan view, the outer connecting portion 55f is annular. The outer connecting portion 55f connects the upper end of the inner connecting portion 55e and the upper end of the outer cylindrical portion 55b to each other.

In FIG. 1, the end portion inside the connecting portion 55c in the radial direction is bent downward in the axial direction, extends inward in the radial direction, and is connected to the inner cylindrical portion 55a. A gap is formed between the inner cylindrical portion 55a and the connecting portion 55c. Therefore, the inner cylindrical portion 55a and the connecting portion 55c can be elastically deformed in the radial direction. Therefore, even in a case where the bearing holder 55 and the housing 20 are expanded and contracted due to the temperature change at the time of assembling the motor 10 or the use of the motor 10, and an excessive pressing force acts on the fitting portion between the bearing holder 55 and the housing 20 or the upper bearing 51, the pressing force is absorbed by the elastic deformation of the inner cylindrical portion 55a and the connecting portion 55c. Therefore, a decrease in fixing strength between the bearing holder 55 and the housing 20 can be suppressed, and the upper bearing 51 can rotatably and smoothly support the shaft 31.

The bearing holder 55 has a plurality of through-holes 56a to 56c and 57a to 57c penetrating the bearing holder 55 in the axial direction. The plurality of through-holes 56a to 56c and 57a to 57c are disposed in the outer connecting portion 55f.

The coil lead wires 91A, 91B, and 91C pass through the corresponding through-holes 56a, 56b, and 56c, respectively, and extend upward the bearing holder 55. The coil lead wires 92A, 92B, and 92C pass through the corresponding through-holes 57a, 57b, and 57c, respectively, and extend upward the bearing holder 55. The inner diameter of the openings of the through-holes 56a and 56c is larger than the outer diameter of the wire holding portion 75. As a result, the connecting portions between the coil lead wires 91a, 91b, and 92c for the neutral point connection and the connection terminals 71a and 72a can maintain electrical insulation from the bearing holder 55. The configuration of the through-holes 56d, 56e disposed in the bearing holder 55 is the same as that of the through-holes 56a and 56c, so that the description thereof will be omitted.

The bearing holder 55 is preferably formed of a metal material. The bearing holder 55 has three recessed portions 58 on the upper surface of the outer edge portion of the bearing holder 55. The recessed portion 58 is provided on the upper surface of the bearing holder 55 by press processing (for example, caulking processing) with a pin or the like. When the press processing is performed on the bearing holder 55, the pressurized portion on the upper surface of the bearing holder 55 plastically deforms to form the recessed portion 58 and a pressing portion 59 protruding outward in the radial direction from the outer surface of the bearing holder 55 is formed. When the bearing holder 55 is disposed in the housing 20, the inner peripheral surface 20c of the housing 20 can be locally pressed by the pressing portion 59. The bearing holder 55 is fixed to the inner peripheral surface 20c by shrink fitting and caulking.

The pressing portion 59 is disposed on the portion tightly fitted to the housing 20 of the bearing holder 55, so that the pressing force between the housing 20 and the bearing holder 55 locally increases and the fastening strength of both members can be further enhanced.

At least one of the recessed portions 58 is disposed in the vicinity of the through-holes 56a to 56c. In the preferred embodiment, as illustrated in FIG. 3, the recessed portion 58 is disposed in the vicinity of the through-hole 56a and in the vicinity of the through-hole 56b. The distance between the through-holes 56a and 56b and the adjacent recessed portion 58 is within 15° in the circumferential direction with respect to the central axis J as a reference. The recessed portion 58 is formed by plastic deformation. Therefore, the strength of the member at the position where the recessed portion 58 is formed is improved. The strength of the bearing holder 55 is likely to decrease in the vicinity of the through-holes 56a to 56c. However, since the recessed portion 58 is disposed in the vicinity of the through-holes 56a to 56c, the strength in the vicinity of the through-holes 56a to 56c can be ensured.

The linear expansion coefficient of the material constituting the bearing holder 55 is equal to the linear expansion coefficient of the material constituting the housing 20. With this configuration, the expansion amount and the contraction amount of the housing 20 and the bearing holder 55 are the same as each other with respect to the temperature change after the bearing holder 55 is attached to the housing 20. Therefore, the attachment of the bearing holder 55 to the housing 20 is less likely to slack. In the case of the preferred embodiment, the material of the bearing holder 55 is, for example, aluminum or an aluminum alloy. The material of the housing 20 is, for example, aluminum or an aluminum alloy. The material of the bearing holder 55 and the housing 20 may be other kinds of materials.

The bus bar unit 60 has phase bus bars 61a to 61c and 62a to 62c, and a bus bar holder 65. The bus bar holder 65 holds the phase bus bars 61a to 61c and 62a to 62c. The bus bar holder 65 has three through-holes 65A, 65B, and 65C penetrating the bus bar holder 65 in the axial direction.

The bus bar holder 65 is fixed to the upper surface of the bearing holder 55. The coil lead wires 91A to 91C and 92A to 92C extending upward from the through-holes 56a to 56c and 57a to 57c of the bearing holder 55 extend upward the bus bar holder 65 through the through-holes 65A to 65C of the bus bar holder 65. The coil lead wires 91A to 91C and 92A to 92C are connected to the phase bus bars 61a to 61c and 62a to 62c on the upper surface of the bus bar holder 65, respectively.

The phase bus bars 61a to 61c and 62a to 62c serve as terminals to be connected to the control device 100. The bus bar unit 60 is fixed to the upper surface of the bearing holder 55 fixed to the housing 20. Therefore, the phase bus bars 61a to 61c and 62a to 62c are positioned with high accuracy in the axial direction within the control device accommodating region 20A. With this configuration, the motor 10 and the control device 100 can be easily connected to each other.

In the preferred embodiment, the motor 10 has the wire support member 70. Therefore, while ensuring electrical insulation from the peripheral member, the coil lead wire can be drawn to the connection destination.

As described above, the coil 43 of the stator 40 of the motor 10 has the coil lead wires 91A to 91C and 92A to 92C for power supply of each phase and the coil lead wires 91a to 91c and 92a to 92c for neutral point connection by a predetermined winding method. The coil lead wires 91A to 91C and 92A to 92C for the power supply of each phase are connected to the bus bar unit 60 disposed above the bearing holder 55. The coil lead wires 91a to 91c and 92a to 92c for the neutral point connection are connected to each other.

The wire support member 70 can position the coil lead wires 91A to 91C and 92A to 92C drawn out above the stator 40 at a specific position and support the coil lead wires along the axial direction by the wire holding portion 75. That is, the coil lead wires 91A to 91C and 92A to 92C can be accurately positioned and drawn out to the phase bus bars 61a to 61c and 62a to 62c of the bus bar unit 60 serving as the connection destination by the wire support member 70.

Furthermore, in the preferred embodiment, the support wall portion 75a of the wire holding portion 75 extends to inside the through-holes 56a to 56c and 57a to 57c of the bearing holder 55. As a result, in the motor 10, the coil lead wires 91A to 91C and 92A to 92C can be drawn out above the bearing holder 55 while being electrically insulated from the bearing holder 55.

Therefore, when the bearing holder 55 is disposed in the assembly in which the stator 40 and the wire support member 70 are combined, the coil lead wires 91A to 91C and 92A to 92C for power supply of each phase can be easily drawn out via the through-holes 56a to 56c and 57a to 57c of the bearing holder 55. The coil lead wires 91A to 91C and 92A to 92C are accurately positioned. Therefore, in a case where the bus bar unit 60 is disposed at a predetermined position of the bearing holder 55, the bus bar unit 60 can be easily connected to the phase bus bars 61a to 61c and 62a to 62c.

In addition, in the wire support member 70, when the coil lead wire can be positioned at a specific position and held along the axial direction, the wire holding portion 75 may not be protruded from the main body portion 73. For example, a V-shaped cutout, a hole or the like is provided in the vicinity of the inner peripheral edge of the main body portion 73 and the coil lead wire may be held by the cutout, the hole or the like. With this configuration, it is possible to hold the coil lead wire with high accuracy. Therefore, when the held coil lead wire is passed through the through-hole of the bearing holder 55, if the hole diameter of the through-hole is increased even if the wire holding portion is not disposed in the through-hole, it is difficult for the coil lead wire to come into contact with the inner peripheral surface of the through-hole, and electrical insulation between the coil lead wire and the bearing holder 55 can be ensured.

In the motor 10, the wire support member 70 holds the coil lead wires 91a to 91c and 92a to 92c via the first neutral point bus bar 71 and the second neutral point bus bar 72. As a result, the coil lead wires 91a to 91c and 92a to 92c for the neutral point connection are connected to each other at the wire support member 70 located above the stator 40. Therefore, the coil lead wires 91a to 91c and 92a to 92c can be connected to each other without increasing the lead length of the coil. As a result, short-circuiting of the coil lead wires 91a to 91c and 92a to 92c can be suppressed.

In addition, the coil lead wires 91a to 91c and 92a to 92c for neutral point connection of the stator 40 are connected to the first neutral point bus bar 71 and the second neutral point bus bar 72 provided in the wire support member 70, so that the configuration of the bus bar unit 60 to which the coil lead wires 91A to 91C and 92A to 92C for power supply are connected can be simplified. As a result, for example, it is possible to easily ensure a space where the control device 100 in the housing 20 is disposed.

The coil lead wires 91a to 91c and 92a to 92c for neutral point connection may be connected to one place depending on the type of winding method in some cases. In this case, the number of neutral point bus bars can be one.

In the motor 10, the coil lead wires 91A to 91C, 92A to 92C, 91a to 91c, and 92a to 92c for power supply and neutral point connection are drawn out above the stator 40. That is, all the coil lead wires of the stator 40 are drawn out to the upper side of the stator 40. As a result, it is not necessary to provide a space for drawing the coil lead wire between the stator 40 and the bottom wall portion 23. Therefore, the stator 40 can be disposed close to the bottom wall portion 23. In the motor 10, since the ratio of the weight of the stator 40 to the total weight is large, it is possible to significantly shift the position of the center of gravity of the motor by changing the position of the stator 40 in the axial direction. As illustrated in FIG. 1, in a case where the motor 10 is attached to an external device in a state where the stator 40 is disposed on the lower side in the axial direction of the motor 10, the center of gravity of the motor 10 is positioned on the external device side. As a result, when the motor 10 is driven, vibration generated from the motor 10 can be suppressed.

The coil lead wires 91A to 91C and 92A to 92C drawn out above the bearing holder 55 are connected to the phase bus bars 61a to 61c and 62a to 62c. The phase bus bars 61a to 61c and 62a to 62c are connected to the control device 100. Since the bus bar unit 60 is fixed to the upper surface of the bearing holder 55, the positional accuracy of the phase bus bars 61a to 61c and 62a to 62c in the axial direction is high as compared with the case where the bus bar unit 60 is fixed to the stator 40. Therefore, the bus bar unit 60 can be accurately attached to a predetermined position, and good electrical connection between the bus bar unit 60 and the control device 100 can be achieved.

The present disclosure is not limited to the preferred embodiment described above and other preferred embodiments and preferred modification examples as described later can be adopted. In the following description, the same configurations as those described above may be omitted by appropriately denoting the same reference numerals or the like in some cases.

Figure 5:
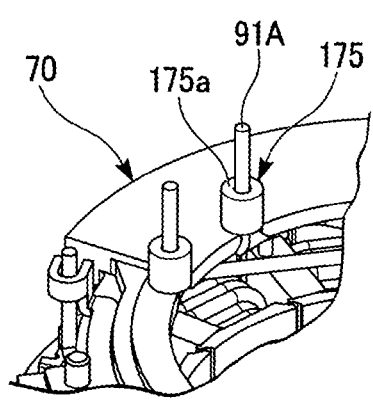
FIG. 5 is a partial perspective view illustrating another preferred aspect of a wire holding portion in the motor of FIG. 1.

FIG. 5 is a partial perspective view illustrating another aspect of a wire holding portion.

As illustrated in FIG. 5, the wire holding portion 175 has a cylindrical support wall portion 175a. The support wall portion 175a has a through-hole penetrating in the axial direction. The coil lead wire 91A extending from the stator 40 is drawn out above the wire support member 70 through the through-hole of the support wall portion 175a.

In the wire holding portion 75 illustrated in FIG. 2, the recessed portion 75b opens inward in the radial direction. Therefore, the coil lead wires 91A to 91C and 92A to 92C can be easily fitted into the recessed portion 75b, and work such as positioning can be performed. On the other hand, in the cylindrical wire holding portion 175 illustrated in FIG. 5, the entire circumference of the coil lead wire is held by the support wall portion 175a. Therefore, it is possible to prevent the coil lead wires 91A to 91C and 92A to 92C from being inclined or being disengaged from the support wall portion 175a, and it is possible to enhance the insulation between the coil lead wires 91A to 91C and 92A to 92C and other members.

Figure 6:
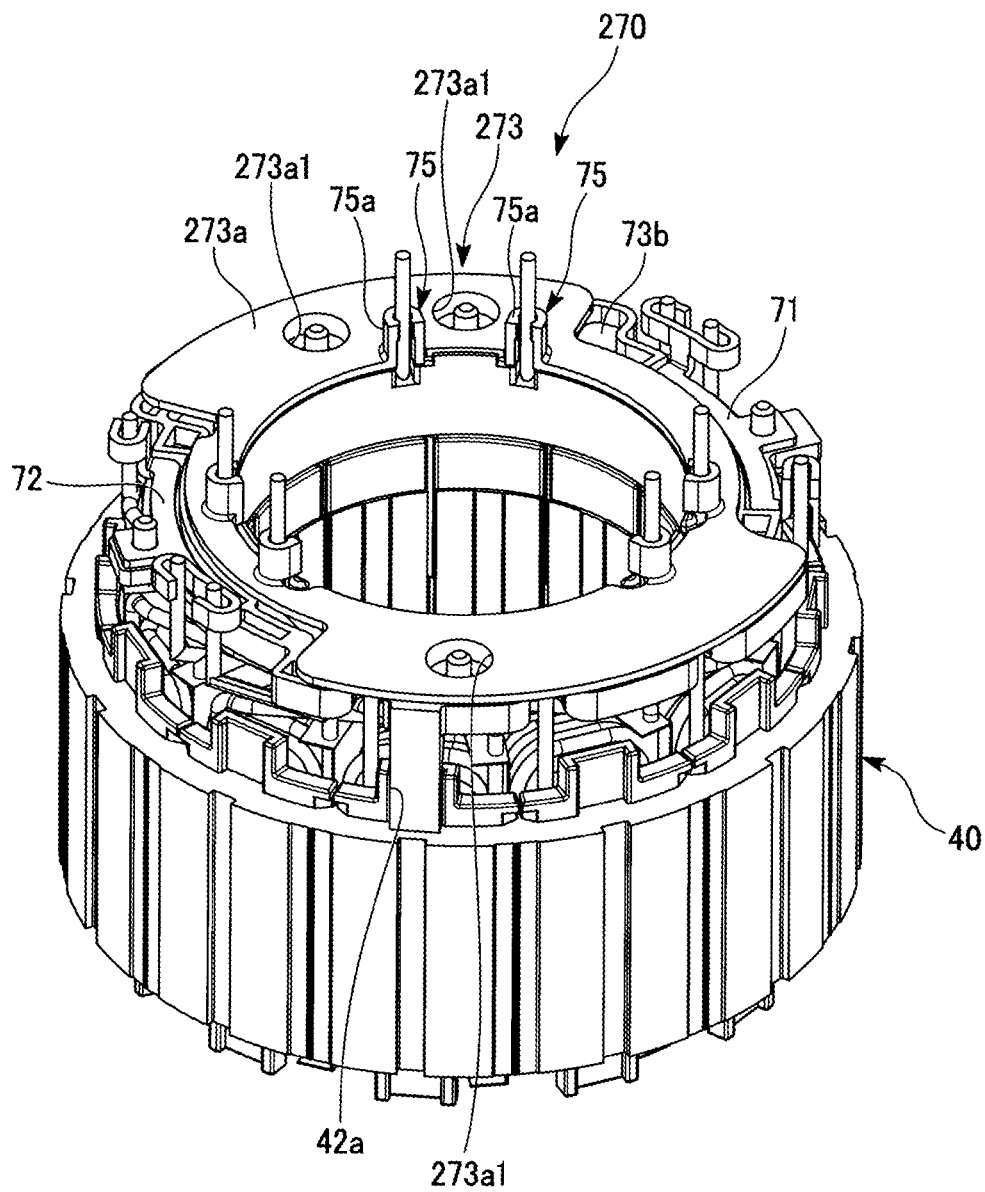
FIG. 6 is a perspective view illustrating a wire support member according to preferred Modification Example 1 in the motor of FIG. 1.
Figure 7:
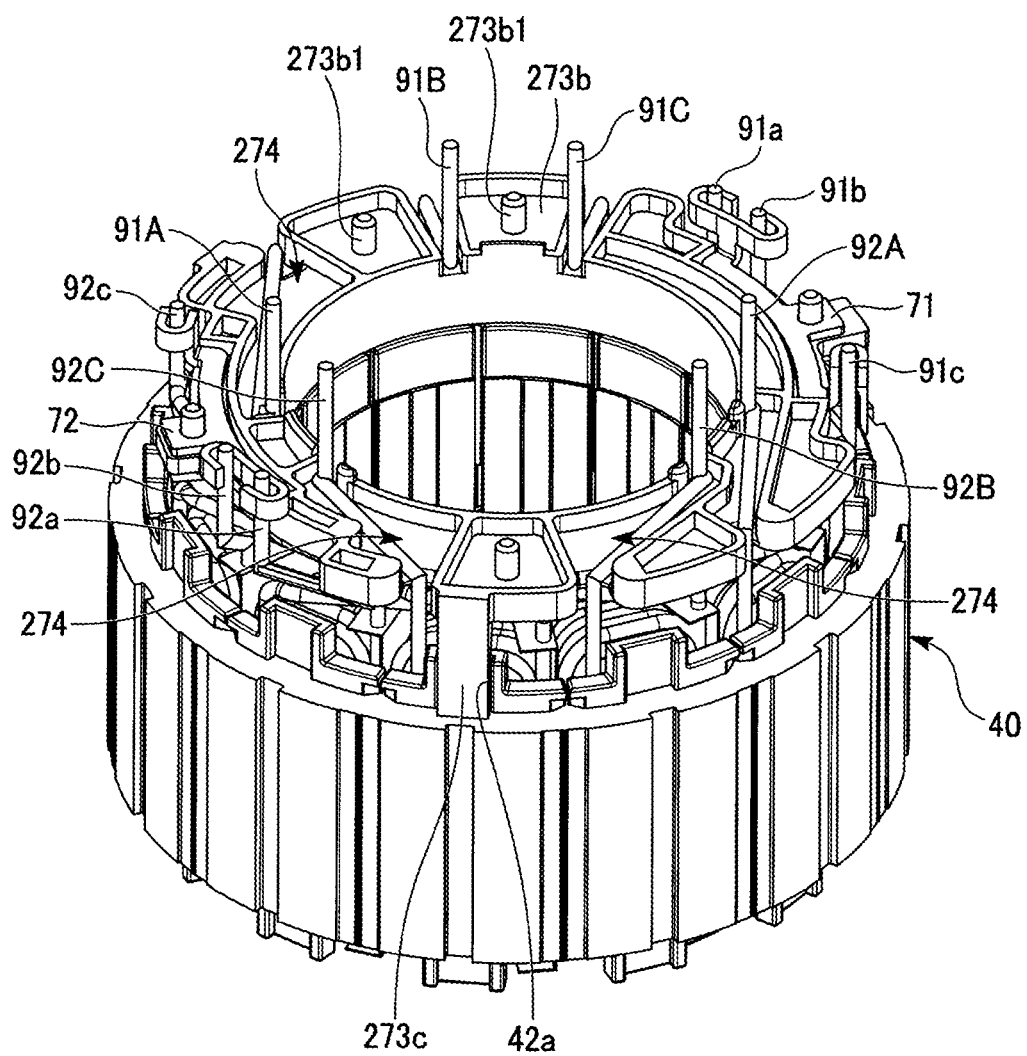
FIG. 7 is a perspective view illustrating a state where an upper support member of the wire support member of FIG. 6 is removed.

FIG. 6 is a perspective view illustrating a wire support member 270 according to Modification Example 1 of the preferred embodiment. FIG. 7 is a perspective view illustrating a state where an upper support member of the wire support member 270 of FIG. 6 is removed.

In FIGS. 6 and 7, instead of the wire support member 70 illustrated in FIG. 1 or 2, the wire support member 270 illustrated in FIG. 6 is attached to the motor 10. The wire support member 270 has a plurality of wire holding portions 75, a first neutral point bus bar 71, a second neutral point bus bar 72, and a main body portion 273. In FIG. 6, the number of the wire holding portions 75 is six. The main body portion 273 has an upper support member 273a illustrated in FIG. 6 and a lower support member 273b illustrated in FIG. 7.

The upper support member 273a and the lower support member 273b are insulating members and are substantially annular in plan view. The six wire holding portions 75 are disposed on the inner peripheral edge of the upper support member 273a. The first neutral point bus bar 71 and the second neutral point bus bar 72 are attached to the outer peripheral portion of the lower support member 273b. The lower support member 273b has a plurality of leg portions 273c. In FIGS. 6 and 7, the number of the leg portions 273c is three. The leg portion 273c extends downward in the axial direction from the outer edge end of the lower support member 273b. The leg portion 273c is supported by the mounting groove 42a of the insulator 42. The outer shape of the upper support member 273a and the outer shape of the lower support member 273b in plan view are not limited to the annular shape, and may be, for example, an elliptical shape, an arc shape, or the like.

The coil lead wires 91A to 91C and 92A to 92C extending from the stator 40 are wound around from the outer peripheral side to the upper surface of the lower support member 273b and are accommodated in the recessed portion 274 on the upper surface of the lower support member 273b. The coil lead wires 91A to 91C and 92A to 92C are bent upward in the axial direction on the inner peripheral edge of the lower support member 273b. The upper support member 273a is attached to the upper surface of the lower support member 273b. The upper support member 273a covers a portion of the coil lead wires 91A to 91C and 92A to 92C disposed in the recessed portion 274. The coil lead wires 91A to 91C and 92A to 92C pass between the upper support member 273a and the lower support member 273b and extend to the wire holding portion 75 of the upper support member 273a. The coil lead wires 91A to 91C and 92A to 92C are held by the wire holding portion 75.

In the above configuration, the upper support member 273a and the lower support member 273b interpose the coil lead wire. The lower support member 273b is disposed between the coil lead wires 91A to 91C and 92A to 92C and the stator 40, so that it is possible to insulate the stator 40 from the coil lead wires 91A to 91C and 92A to 92C. The upper support member 273a is disposed between the coil lead wires 91A to 91C and 92A to 92C and the bearing holder 55, so that it is possible to ensure insulation between the coil lead wire and the bearing holder 55. That is, in the above configuration, it is not necessary to provide the insulating tube 98 of the coil lead wire illustrated in FIG. 1.

The upper support member 273a has a through-hole 273a1 penetrating in the axial direction. The lower support member 273b has a protrusion portion 273b1 extending in the axial direction. The protrusion portion 273b1 is inserted into the through-hole 273a1 and the protrusion portion 273b1 melts and solidifies by heating or the like. As a result, the upper support member 273a is fixed to the lower support member 273b.

The upper support member 273a can be fixed to the lower support member 273b by press fitting, adhesion, snap fitting, or the like. The wire holding portion 75 may be provided not in the upper support member 273a but in the lower support member 273b.

Figure 8:
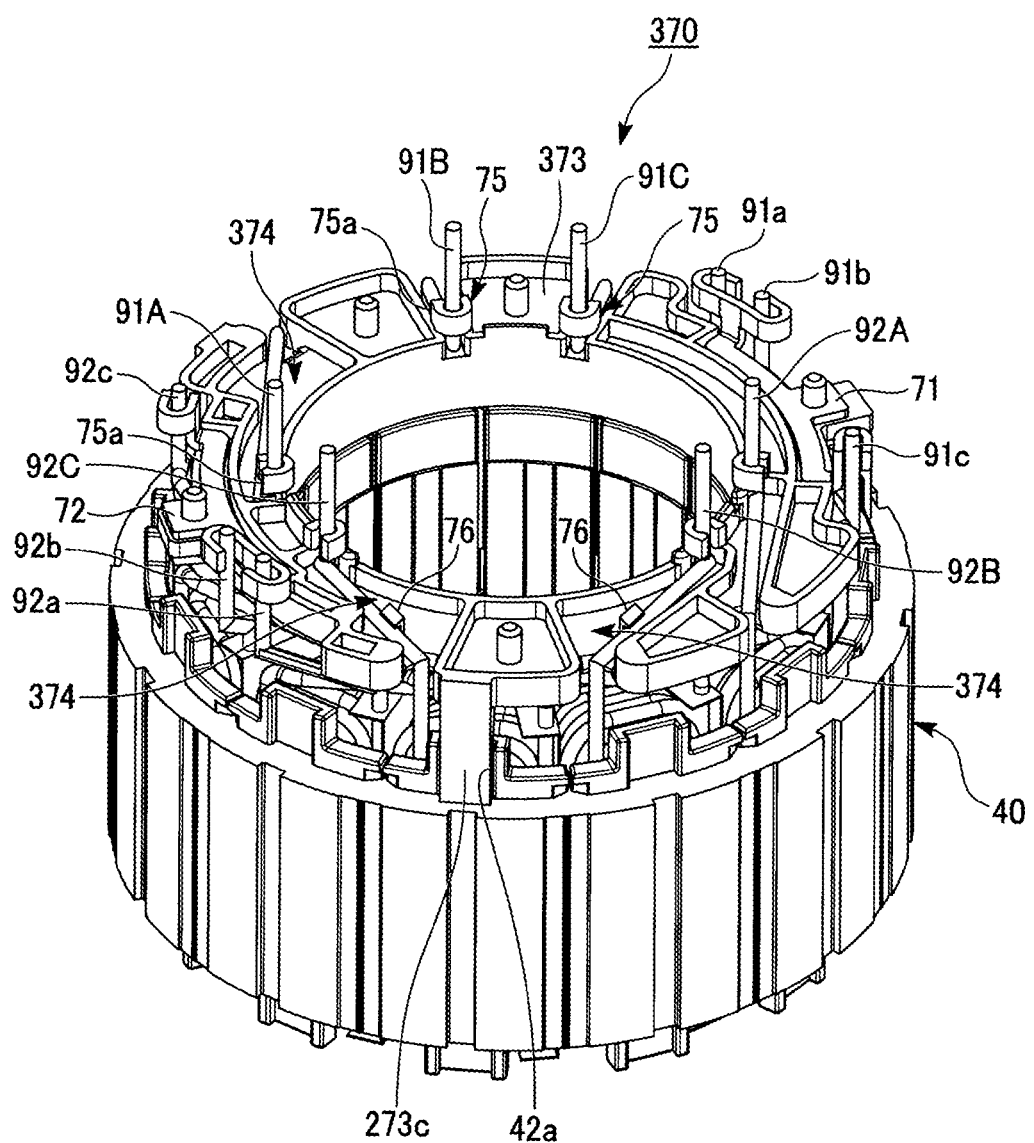
FIG. 8 is a perspective view illustrating a wire support member according to Modification Example 2 in the motor of FIG. 1.

FIG. 8 is a perspective view illustrating a wire support member 370 according to Modification Example 2 of the preferred embodiment. In FIG. 8, instead of the wire support member 70 illustrated in FIG. 1 or 2, the wire support member 370 is attached to the motor 10. The wire support member 370 has a plurality of wire holding portions 75, a first neutral point bus bar 71, a second neutral point bus bar 72, and a main body portion 373. In FIG. 8, the number of the wire holding portions 75 is six.

The main body portion 373 is an annular member in plan view. The six wire holding portions 75 are disposed on the inner peripheral edge of the main body portion 373. The first neutral point bus bar 71 and the second neutral point bus bar 72 are attached to the outer peripheral portion of the main body portion 373.

The recessed portion 374 is disposed on the upper surface of the main body portion 373. The coil lead wires 91A to 91C and 92A to 92C extending from the stator 40 are wound around from the outer peripheral side to the upper surface of the main body portion 373 and are accommodated in the recessed portion 374. The coil lead wires 91A to 91C and 92A to 92C extend to the wire holding portion 75 at the inner peripheral edge along the upper surface of the main body portion 373. The coil lead wires 91A to 91C and 92A to 92C are held by the wire holding portion 75.

The main body portion 373 has a fixing portion 76 that fixes the coil lead wire 92B and 92C to the upper surface of the main body. More specifically, the fixing portion 76 extending in the axial direction is disposed in the recessed portion 374. In Modification Example 2, the fixing portion 76 is substantially L-shaped. The tip end of the fixing portion 76 extends outward in the radial direction from the inside in the radial direction. The coil lead wires 92B and 92C are disposed between the fixing portion 76 and the upper surface of the main body portion 373. Preferably, the fixing portion 76 is in contact with the coil lead wire 92B and 92C in the axial direction and the radial direction. As a result, it is possible to prevent the coil lead wires 92B and 92C from floating upward in the axial direction from the upper surface of the main body portion 373. In addition, even when an external force or the like is applied to the motor 10 and the coil lead wires 92B and 92C attempt to move on the upper surface of the main body portion 373, the coil lead wires hit the fixing portion 76, so that it is possible to suppress the movement of the coil lead wires 92B and 92C in the radial direction. The fixing portion 76 may be provided in all of the plurality of recessed portions 374 or may be provided only in a portion of the recessed portion 374. In addition, the shape of the fixing portion 76 is not limited to the above-described shape, and may be another shape. The fixing portion 76 may interpose a portion of the coil lead wires 92B and 92C.

In the configuration of Modification Example 2, the coil lead wires 91A to 91C and 92A to 92C are drawn out on the upper surface of the main body portion 373. That is, the main body portion 373 is disposed between the stator 40 and the coil lead wires 91A to 91C and 92A to 92C. As a result, it is possible to insulate the stator 40 from the coil lead wires 91A to 91C and 92A to 92C. In addition, the fixing portion 76 suppresses movement of the coil lead wires 92B and 92C on the upper surface of the main body portion 373. The main body portion 373 is disposed between the coil lead wires 91A to 91C and 92A to 92C and the bearing holder 55. As a result, insulation between the coil lead wires 91A to 91C and 92A to 92C and the bearing holder 55 can be ensured. Unlike the configuration of Modification Example 1, in Modification Example 2, the upper support member 273a (refer to FIG. 6) is not disposed between the coil lead wires 91A to 91C and 92A to 92C and the bearing holder 55. That is, the coil lead wires 91A to 91C and 92A to 92C are exposed to the outside of the recessed portion 374. Therefore, from the viewpoint of insulation, it is preferable that the coil lead wires 91A to 91C and 92A to 92C are disposed away from the bearing holder 55. The insulating member such as an insulating tube may be attached to the coil lead wires 91A to 91C and 92A to 92C.

Figure 9:
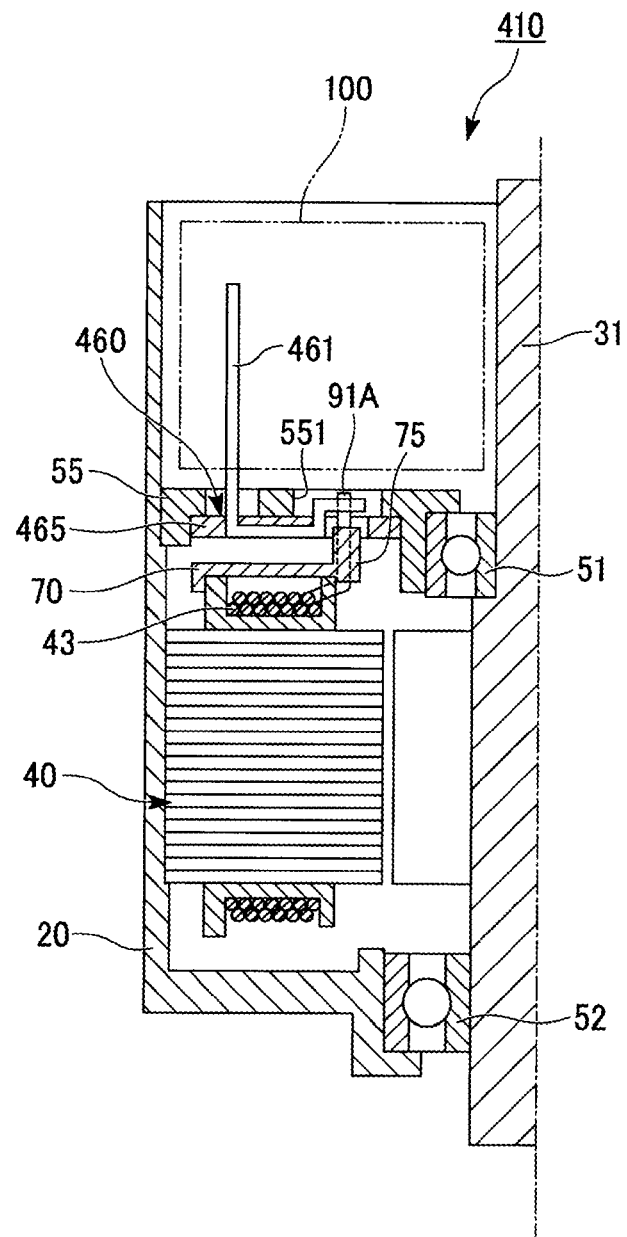
FIG. 9 is a partial cross-sectional view illustrating a motor according to Modification Example 3 of the preferred embodiment.

FIG. 9 is a partial cross-sectional view illustrating a motor 410 according to Modification Example 3 of the preferred embodiment.

In the motor 10 illustrated in FIG. 1, the bus bar unit 60 is fixed to the upper surface of the bearing holder 55. On the other hand, the motor 410 illustrated in FIG. 9 is provided with a bus bar unit 460 fixed to the lower surface of the bearing holder 55. The bus bar unit 460 has a bus bar 461 and a bus bar holder 465 that holds the bus bar 461. The bus bar 461 is connected to the coil lead wire 91A held by the wire holding portion 75. The bus bar 461 extends upward the bearing holder 55 via the through-hole of the bearing holder 55, and is connected to the control device 100.

The bus bar unit 460 has a bus bar connected to the coil lead wires 91A to 91C and 92A to 92C. In FIG. 9, only the bus bar 461 connected to the coil lead wire 91A is illustrated and bus bars connected to the other coil lead wires 91B, 91C, and 92A to 92C are not illustrated.

In the configuration of Modification Example 3, the bus bar unit 460 is fixed to the lower surface of the bearing holder 55. Therefore, even when the stator 40, the wire support member 70, and the like are shifted from the predetermined position in the axial direction, the upper end of the bus bar 461 can be accurately positioned with respect to the housing 20. Therefore, it is possible to stably connect the bus bar 461 and the control device 100 to each other.

The portion connected to the coil lead wire 91A in the bus bar 461 is positioned in the through-hole 551 provided in the bearing holder 55. As a result, the axial dimension between the portion and the bearing holder 55 can be reduced.

Figure 10:
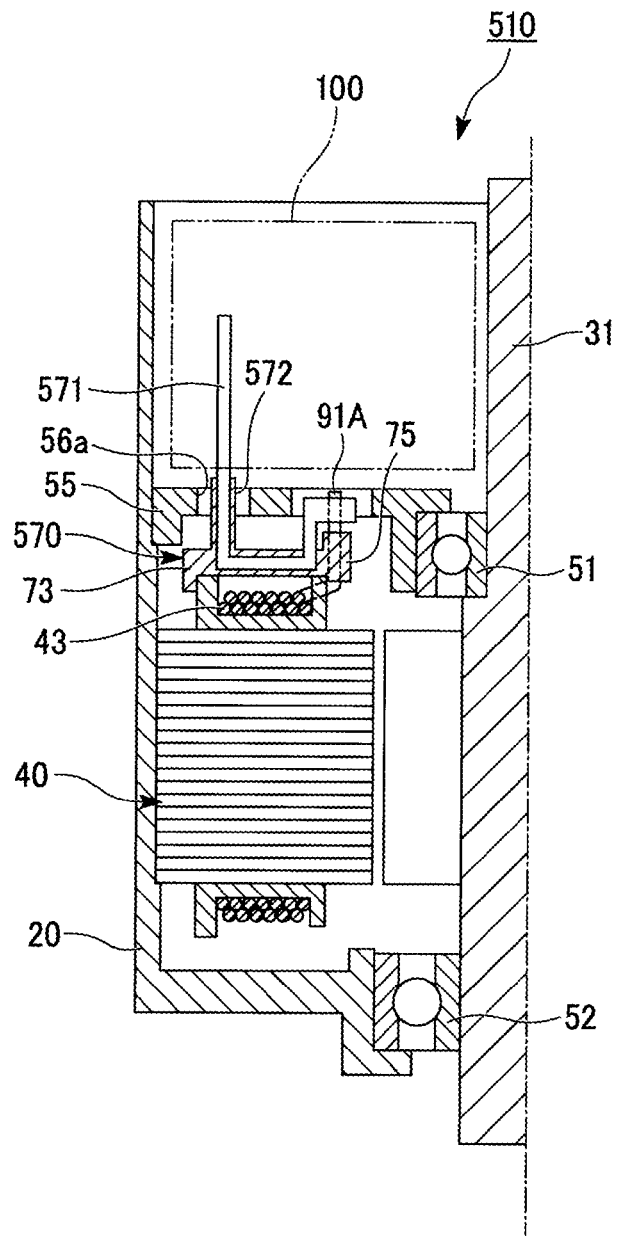
FIG. 10 is a partial cross-sectional view illustrating a motor according to Modification Example 4 of the preferred embodiment.

FIG. 10 is a partial cross-sectional view illustrating a motor 510 according to Modification Example 4.

As illustrated in FIG. 10, the motor 510 has a wire support member 570. The wire support member 570 has a configuration in which a connection terminal 571 is provided in the wire support member 70 illustrated in FIGS. 1 and 2. The connection terminal 571 is fixed to the main body portion 73 of the wire support member 570. One end portion of the connection terminal 571 is connected to the coil lead wire 91A held by the wire holding portion 75. The other end portion of the connection terminal 571 extends upward the bearing holder 55 through the through-hole 56a of the bearing holder 55 and is connected to the control device 100.

The wire support member 570 has a terminal holding portion 572. The terminal holding portion 572 covers a portion of the connection terminal 571 passing through the through-hole 56a. The terminal holding portion 572 is an insulating material, and can electrically insulate the connection terminal 571 from the bearing holder 55.

The wire support member 570 has connection terminals connected to the coil lead wires 91A to 91C and 92A to 92C. In FIG. 10, only the connection terminal 571 connected to the coil lead wire 91A is illustrated and connection terminals connected to the other coil lead wires 91B, 91C, and 92A to 92C are not illustrated.

In Modification Example 4, the wire support member 570 is provided with the connection terminal 571. Therefore, in the motor 510, a bus bar unit connected to the control device 100 is unnecessary. As a result, the number of parts can be reduced, and the size of the motor 510 can be reduced in the axial direction.

Figure 11:
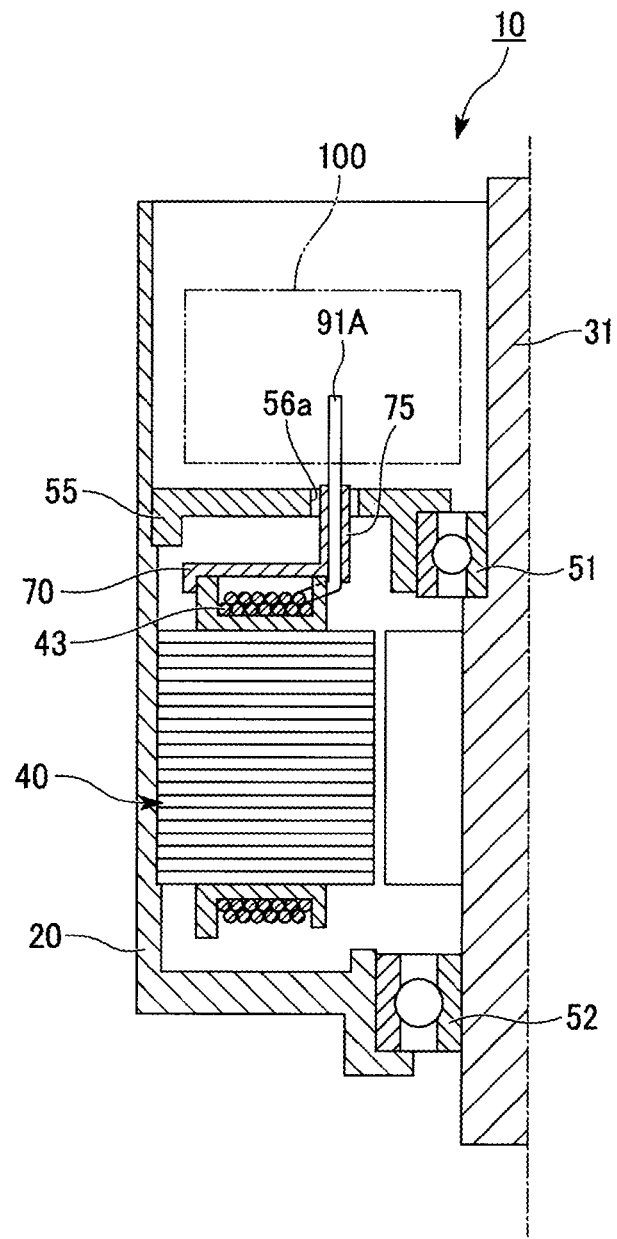
FIG. 11 is a partial cross-sectional view illustrating a motor according to Modification Example 5 of the preferred embodiment.

FIG. 11 is a partial cross-sectional view illustrating a motor 10 according to Modification Example 5. Unlike the structure of the motor 10 illustrated in FIGS. 1 and 2, in the motor 10 of Modification Example 5, the bus bar unit 60 is not provided and the coil lead wire 91A and the control device 100 are directly connected to each other. In this structure, since the bus bar unit 60 is unnecessary, the number of parts can be reduced and the size of the motor can be reduced in the axial direction.

In a motor 610 of this modification example, a plurality of coils constitutes a plurality of connection systems. More specifically, as illustrated in FIGS. 12 to 15, the plurality of coils is configured to include a first connection system A including a first coil group 43A and a second connection system B including a second coil group 43B. As a result, even when a problem occurs in any one of the connection systems of the first connection system A and the second connection system B, it is possible to supply a current to the motor 610 via the other connection system. As illustrated in FIG. 14, the first connection system A and the second connection system B are configured to include three-phase circuits in which the coils included therein are connected to each other by a star connection. The plurality of connection systems are a plurality of circuits in which the external power supplies to be electrically connected to each other are different from each other and currents are supplied independently for each connection system.

The first coil group 43A includes power supply side coils 43Aa, 43Ac, and 43Ae, and neutral point side coils 43Ab, 43Ad, and 43Af. The power supply side coil 43Aa and the neutral point side coil 43Ab are U-phase coil groups connected to each other in series. The power supply side coil 43Ac and the neutral point side coil 43Ad are V-phase coil groups connected to each other in series. The power supply side coil 43Ae and the neutral point side coil 43Af are W-phase coil groups connected to each other in series.

The second coil group 43B includes power supply side coils 43Ba, 43Bc, and 43Be, and neutral point side coils 43Bb, 43Bd, and 43Bf. The power supply side coil 43Ba and the neutral point side coil 43Bb are U-phase coil groups connected to each other in series. The power supply side coil 43Bc and the neutral point side coil 43Bd are V-phase coil groups connected to each other in series. The power supply side coil 43Be and the neutral point side coil 43Bf are W-phase coil groups connected to each other in series.

Figure 12:
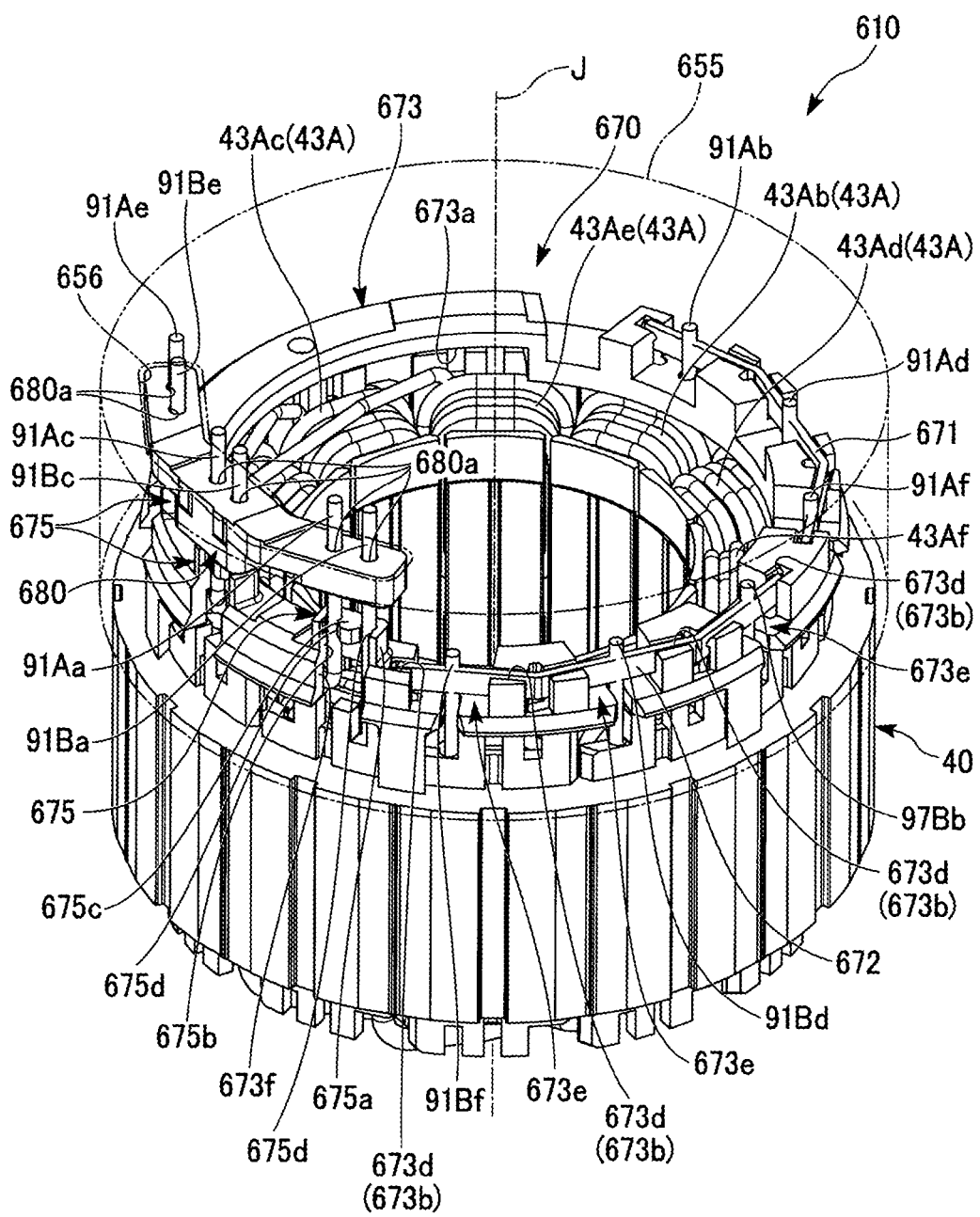
FIG. 12 is a perspective view illustrating a portion of a motor according to Modification Example 6 of the preferred embodiment.

As illustrated in FIG. 12, the bearing holder 655 has the through-hole 656. Lead wires drawn from the power supply side coils 43Aa to 43Be are passed through the through-hole 656, respectively. The shape of the opening of the through-hole 656 in plan view is substantially rectangular. In FIG. 12, two coil lead wires pass through each through-hole 656. The three through-holes 656 are disposed along the circumferential direction. That is, in this modification example, the plurality of coils include a plurality of power supply side coils 43Aa to 43Be in which the coil lead wire passes through the through-hole 656. The power supply side coils 43Aa to 43Be are connected to the control device 100 via each coil lead wire. The coil lead wire is a portion drawn out from the coil body wound around the teeth 41a and includes a portion extending in a direction intersecting the axial direction and a portion extending in the axial direction.

As illustrated in FIG. 14, one end portion of the coil lead wire drawn out from the neutral point side coils 43Ab to 43Bf is a neutral point N. One end portions of the coil lead wires of the neutral point side coils 43Ab, 43Ad, and 43Af are connected to a first neutral point bus bar 671 to be described later. That is, a portion which is the neutral point N in the lead wires of the neutral point side coils 43Ab, 43Ad, and 43Af is connected to the first neutral point bus bar 671 described later. One end portions of the coil lead wires of the neutral point side coils 43Bb, 43Bd, and 43Bf are connected to a second neutral point bus bar 672 to be described later. That is, a portion which is the neutral point N of each coil lead wire of the neutral point side coils 43Bb, 43Bd, and 43Bf is connected to the second neutral point bus bar 672 described later.

Figure 15:
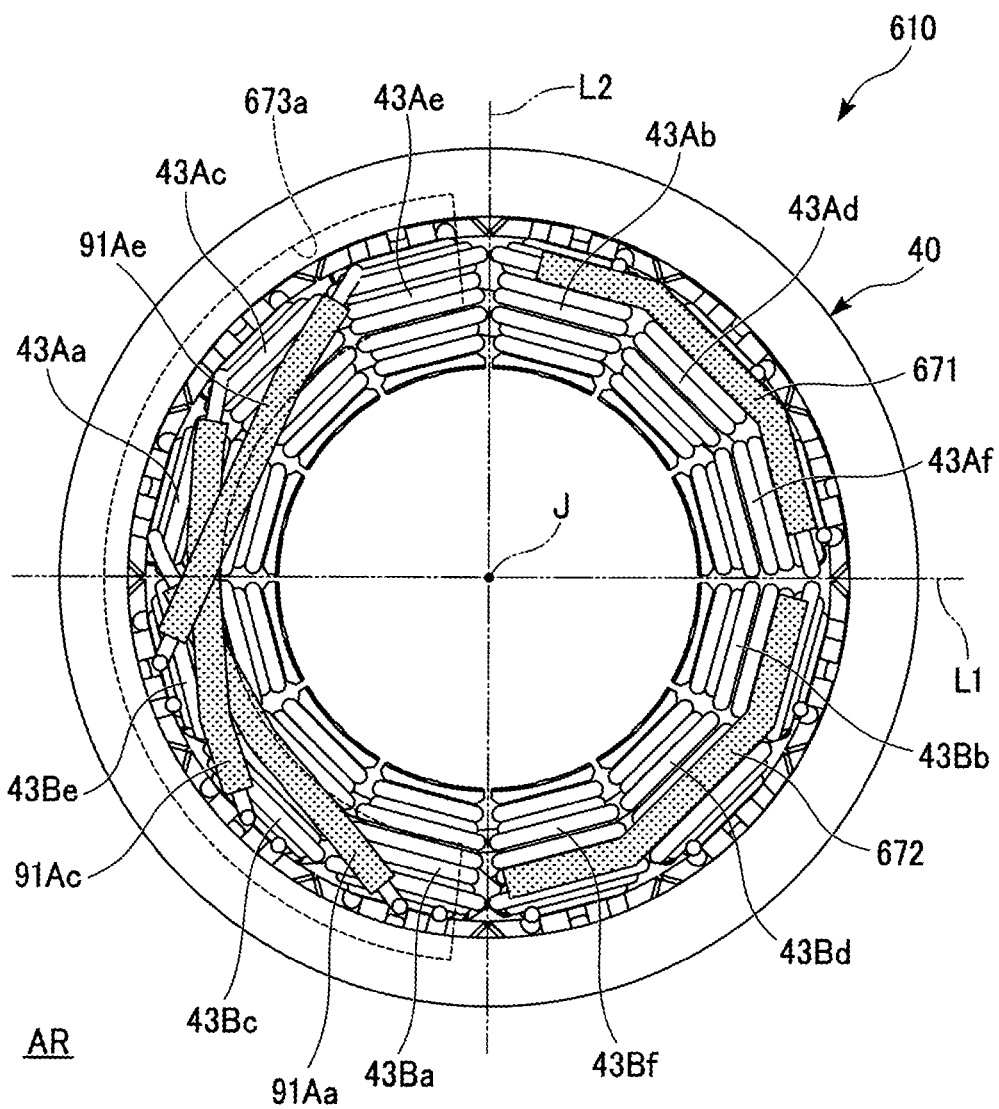
FIG. 15 is a plan view illustrating a stator unit according to Modification Example 6 of the preferred embodiment.

As illustrated in FIG. 15, the plurality of coils are disposed separately for each connection system. Specifically, the first coil group 43A of the first connection system A and the second coil group 43B of the second connection system B are respectively and collectively disposed on opposite sides with an imaginary line L1 interposed therebetween in plan view. The imaginary line L1 is a straight line that is orthogonal to the central axis J and passes through the central axis J.

The power supply side coils 43Aa to 43Be and the neutral point side coils 43Ab to 43Bf of each connection system are respectively and collectively disposed. Specifically, the power supply side coils 43Aa to 43Be and the neutral point side coils 43Ab to 43Bf are respectively and collectively disposed on opposite sides with an imaginary line L2 interposed therebetween in plan view. That is, the plurality of power supply side coils 43Aa to 43Be are disposed adjacent to each other, and the plurality of neutral point side coils 43Ab to 43Bf are disposed adjacent to each other. The imaginary line L2 is a straight line that is orthogonal to both the central axis J and the imaginary line L1 and passes through the central axis J. The fact that "a plurality of coils are disposed adjacent to each other" includes that a plurality of coils are respectively attached to the adjacent teeth 41a.

As illustrated in FIG. 12, the wire support member 670 has a conducting member, a main body portion 673, and a wire holding portion 675. The conducting member includes a first conducting member 671 and a second conducting member 672. In the following description, the first conducting member 671 is referred to as a first neutral point bus bar 671, and the second conducting member 672 is referred to as a second neutral point bus bar 672. The first neutral point bus bar 671 connects each coil lead wire of the first connection system A to each other. The second neutral point bus bar 672 connects each coil lead wire of the second connection system B to each other. The first neutral point bus bar 671 and the second neutral point bus bar 672 are held by the main body portion 673.

As illustrated in FIGS. 12 and 15, the first neutral point bus bar 671 and the second neutral point bus bar 672 are plate-shaped members and extend along the substantially circumferential direction. More specifically, the first neutral point bus bar 671 and the second neutral point bus bar 672 extend in a polygonal line shape along the substantially circumferential direction. A plate surface of the first neutral point bus bar 671 and a plate surface of the second neutral point bus bar 672 are preferably parallel to the axial direction.

As illustrated in FIG. 15, the first neutral point bus bar 671 overlaps the neutral point side coils 43Ab, 43Ad, and 43Af in plan view. The second neutral point bus bar 672 overlaps the neutral point side coils 43Bb, 43Bd, and 43Bf in plan view.

As illustrated in FIG. 12, the main body portion 673 is annular with the central axis J as a center. The main body portion 673 has a recessed portion 673a recessed upward from the lower surface. As illustrated in FIG. 15, the outer shape of the recessed portion 673a in plan view is substantially semicircular arc shape extending in the circumferential direction. The recessed portion 673a overlaps the power supply side coils 43Aa to 43Be in plan view. The recessed portion 673a faces at least a portion of the coil lead wires 91Aa to 91Be passed through the through-hole 656 via a gap in the axial direction.

In FIG. 15, the inner side surface of the recessed portion 673a faces the coil lead wire 91Aa of the power supply side coil 43Aa, the coil lead wire 91Ac of the power supply side coil 43Ac, and the coil lead wire 91Ae of the power supply side coil 43Ae via the gap in the axial direction. The recessed portion 673a is disposed above the stator 40. Therefore, it is possible to draw out the coil lead wires 91Aa, 91Ac, and 91Ae of the power supply side coils 43Aa, 43Ac, and 43Ae above the stator 40. As a result, when the motor is assembled, the coil lead wires 91Aa, 91Ac, and 91Ae can be easily drawn out and the coil lead wires of each power supply side coil described later can be collectively disposed in a predetermined region.

In addition, for example, in a case where the power supply side coils 43Aa to 43Be distributed in the circumferential direction are disposed and the coil lead wires of the power supply side coils 43Aa to 43Be are collectively disposed in a predetermined region, a region where the coil lead wire is drawn out is likely to be large. Therefore, in order to ensure a space for drawing out the coil lead wire, it is necessary to enlarge the region where the recessed portion 673a is provided, or to provide a plurality of recessed portions 673a. In this case, the structure of the main body portion 673 may be complicated in some cases.

On the other hand, in the present modification example, a plurality of power supply side coils 43Aa to 43Be are disposed adjacent to each other as described above. Therefore, when the coil lead wires 91Aa to 91Be of each power supply side coil 43Aa to 43Be in a predetermined region are collectively disposed, it is possible to minimize the region where the coil lead wires 91Aa to 91Be are drawn out. As a result, by providing one recessed portion 673a in the minimum region, it is possible to suitably ensure a space where the coil lead wires 91Aa to 91Be are drawn out.

Figure 16:
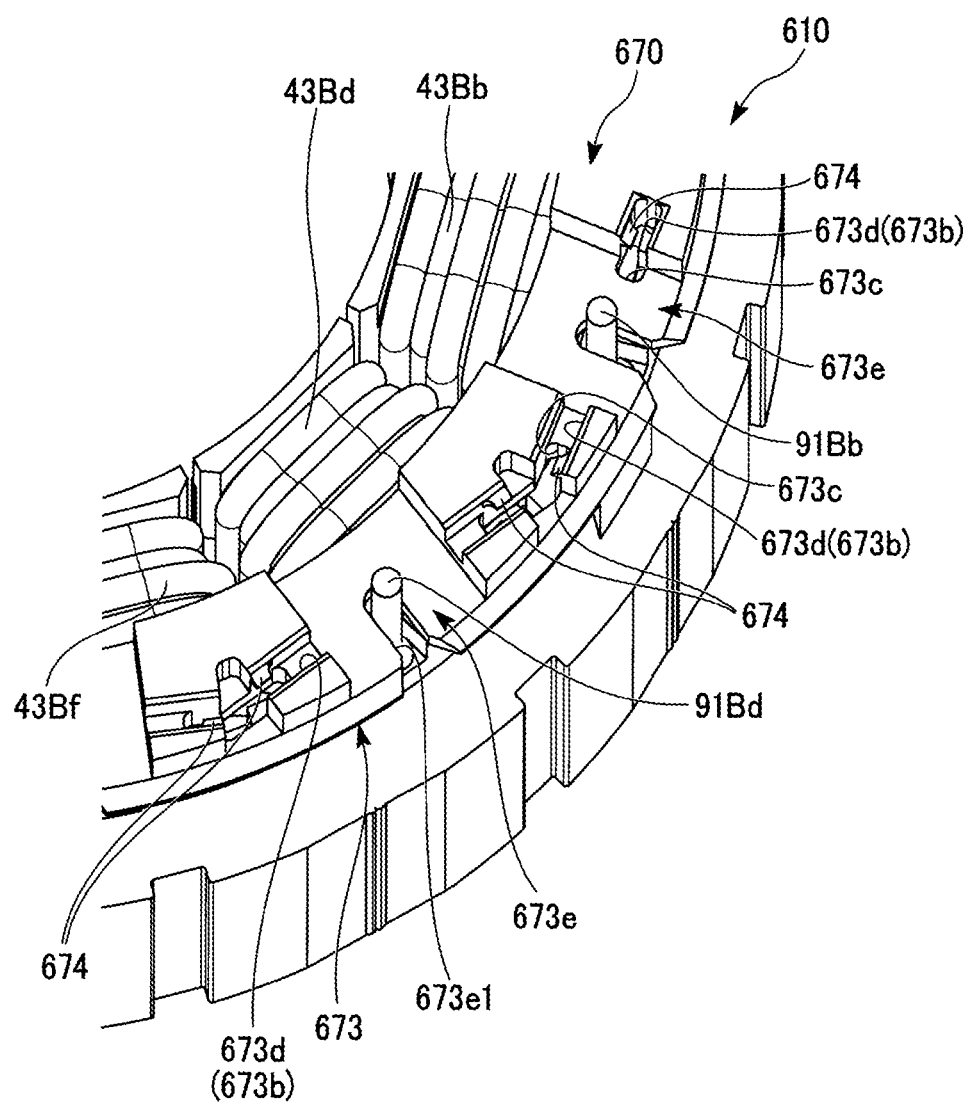
FIG. 16 is a perspective view illustrating the portion of the motor according to Modification Example 6 of the preferred embodiment.

As illustrated in FIG. 16, the main body portion 673 has a groove portion 673b, a protrusion portion 674, and a hole 673c. The groove portion 673b is recessed downward and extends along the circumferential direction. As illustrated in FIG. 12, the main body portion 673 has the groove portion 673b that holds the first neutral point bus bar 671 and the groove portion 673b that holds the second neutral point bus bar 672, respectively. The first neutral point bus bar 671 and the second neutral point bus bar 672 are press-fitted into the groove portion 673b. As a result, the first neutral point bus bar 671 and the second neutral point bus bar 672 are fitted and held in the groove portion 673b from above.

Each groove portion 673b is provided discontinuously along the circumferential direction. In FIG. 12, the groove portion 673b is configured to include four division groove portions 673d. The division groove portions 673d are disposed with a space along the circumferential direction. A first recessed portion 673e is disposed between the adjacent division groove portions 673d and the division groove portions 673d in the circumferential direction. The first recessed portion 673e is recessed downward from a portion of the main body portion 673 provided with the division groove portion 673d, and penetrates the main body portion 673 in the radial direction.

As illustrated in FIG. 16, a cutout 673e1 recessed inward in the radial direction is disposed on the bottom surface of the first recessed portion 673e. The coil lead wires 91Ab to 91Bf of neutral point side coils 43Ab to 43Bf are passed through the cutout 673e1. As illustrated in FIG. 12, a portion of each coil lead wire 91Ab to 91Bf protruding upward from the cutout 673e1 is fixed to the first neutral point bus bar 671 or the second neutral point bus bar 672, for example, by welding.

In this manner, the first recessed portion 673e is provided and the coil lead wires 91Ab to 91Bf and each neutral point bus bar are fixed to each other inside the first recessed portion 673e, so that it is easy to bring a welding jig closer to a welded part during the welding operation and to perform the welding operation. In addition, it is possible to release the welded portion itself between the coil lead wires 91Ab to 91Bf and each neutral point bus bar in the radial direction.

As illustrated in FIG. 16, the protrusion portion 674 protrudes from above the inner side surface of the groove portion 673b in a direction perpendicular to the axial direction. One or two protrusion portions 674 are disposed in each of the division groove portions 673d. The protrusion portion 674 includes the protrusion portion 674 protruding inward in the radial direction from the inner side surface of the outer side of the groove portion 673b in the radial direction and the protrusion portion 674 protruding outward in the radial direction from the inner side surface of the inner side of the groove portion 673b in the radial direction. The protrusion portion 674 protrudes to the inner side in the radial direction from the inner side surface outside the groove portion 673b in the radial direction. The protrusion portions 674 are respectively disposed on the inner side surfaces facing each other of the groove portion 673b. However, the protrusion portion 674 may be disposed only on one inner side surface. The protrusion portions 674 on both inner side surfaces may or may not face each other.

The distance between the tip end of the protrusion portion 674 disposed on one inner side surface and the tip end of the protrusion portion 674 disposed on the other inner side surface is smaller than the thicknesses of the first neutral point bus bar and the second neutral point bus bar. As a result, when the first neutral point bus bar 671 is fitted in the groove portion 673b, the protrusion portion 674 presses the first neutral point bus bar 671. The same applies to the second neutral point bus bar 672. That is, when the second neutral point bus bar 672 is fitted in the groove portion 673b, the protrusion portion 674 presses the second neutral point bus bar 672. Therefore, the first neutral point bus bar 671 and the second neutral point bus bar 672 can be easily attached in the groove portion 673b, and can be firmly held. As a result, the main body portion 673 can stably hold the first neutral point bus bar 671 and the second neutral point bus bar 672.

The hole 673c penetrates the main body portion 673 in the axial direction. The hole 673c is provided in the bottom surface of the groove portion 673b. At least a portion of the hole 673c overlaps the protrusion portion 674 in plan view. Therefore, for example, when the wire support member 670 is molded using a mold, a portion that molds the protrusion portion 674 of the mold can be pulled out via the hole 673c. As a result, it is possible to simplify the structure of the mold that molds the wire support member 670 and to facilitate the molding of the wire support member 670 using the mold.

Figure 13:
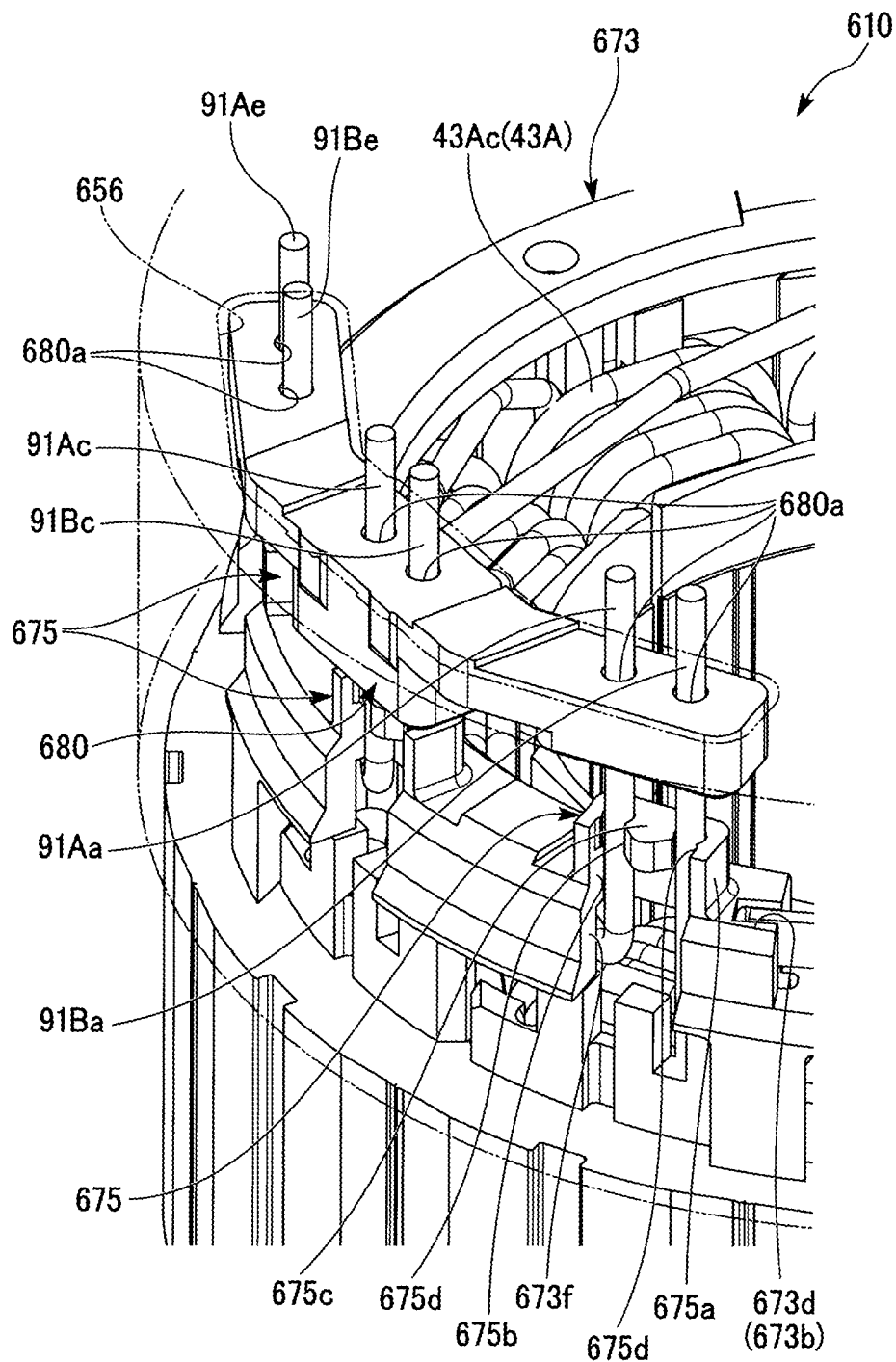
FIG. 13 is a perspective view illustrating the portion of the motor according to Modification Example 6 of the preferred embodiment, and is a partial enlarged view of FIG. 12.
Figure 14:
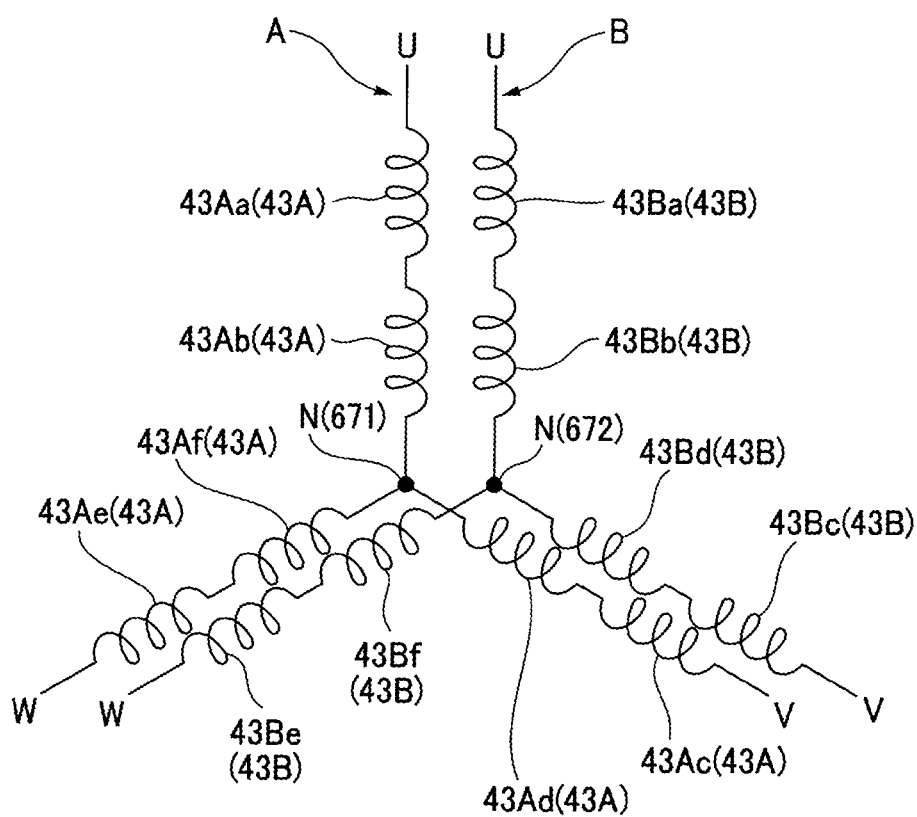
FIG. 14 is a schematic diagram of a three-phase circuit formed by a coil group according to Modification Example 6 of the preferred embodiment.

As illustrated in FIGS. 12 and 13, the wire holding portion 675 protrudes upward from the main body portion 673. The coil lead wire held by the wire holding portion 675 is the coil lead wires 91Aa to 91Be of the power supply side coils 43Aa to 43Be. The wire holding portion 675 has a support wall portion 675a, a recessed portion 675b, and a holding recessed portion 675d. The support wall portion 675a protrudes upward from the main body portion 673. A lid portion 675c is provided at the upper end of the support wall portion 675a. A second recessed portion 673f is provided in a portion of the main body portion 673 where the wire holding portion 675 is provided. The second recessed portion 673f is recessed inward in the radial direction from the outer peripheral surface of the main body portion 673, and is opened to both sides in the axial direction. The recessed portion 675b opens outward in the radial direction. The recessed portion 675b opens downward and communicates with the second recessed portion 673f.

The holding recessed portion 675d is provided in the lid portion 675c. The coil lead wires 91Aa to 91Be are held in the holding recessed portion 675d. The coil lead wires 91Aa to 91Be drawn out above the stator 40 are bent upward in the axial direction in the vicinity of the second recessed portion 673f, held in the holding recessed portion 675d via the second recessed portion 673f and the recessed portion 675b, and is drawn out above the lid portion 675c.

The holding recessed portion 675d opens in the radial direction. The coil lead wire of the power supply side coil wound around the teeth 41a extending in the radial direction is drawn out above the stator 40 in the radial direction, bent in the axial direction via the opening of the holding recessed portion 675d, and held in the holding recessed portion 675d. As a result, the coil lead wire can be easily held in the holding recessed portion 675d. The opening width of the opening end of the holding recessed portion 675d is narrower than the width of the rear side of the holding recessed portion 675d and is smaller than the wire diameter of the coil lead wire. Therefore, it is possible to prevent the coil lead wire accommodated in the holding recessed portion 675d from easily being disengaged.

In FIGS. 12 and 13, the holding recessed portion 675d opens outward in the radial direction. Therefore, the tip end of the coil lead wire drawn out from the power supply side coil and that draws out above the stator 40 can be bent upward in the axial direction from the outer side in the radial direction and held in the holding recessed portion 675d. No other members constituting the motor are disposed outside the holding recessed portion 675d in the radial direction. Therefore, it is easy to handle such as bending the coil lead wire and it is easier to hold the coil lead wire in the holding recessed portion 675d. The holding recessed portion 675d is recessed inward in the radial direction from the end portion outside the lid portion 675c in the radial direction. A plurality of holding recessed portion 675d (for example, two each) are provided for each wire holding portion 675. As a result, the wire holding portion 675 can hold the plurality of coil lead wires (for example, two). The holding recessed portion 675d may be opened inward in the radial direction.

In this manner, the wire holding portion 675 collectively holds the plurality of the coil lead wires via the holding recessed portion 675d. In FIGS. 12 and 13, three wire holding portions 675 are provided, and two coil lead wires are held in two holding recessed portions 675d, respectively. Three wire holding portions 675 are respectively positioned at substantially the same positions as the power supply side coils 43Ba, 43Bc, and 43Be in the circumferential direction.

The wire holding portion 675 positioned at substantially the same position as the power supply side coil 43Ba in the circumferential direction holds the coil lead wires 91Aa and 91Ba. The wire holding portion 675 positioned at substantially the same position as the power supply side coil 43Bc in the circumferential direction holds the coil lead wires 91Ac and 91Bc. The wire holding portion 675 positioned at substantially the same position as the power supply side coil 43Be in the circumferential direction holds the coil lead wires 91Ae and 91Be. That is, the plurality of coil lead wires collectively held by each wire holding portion 675 are coil lead wires of the plurality of power supply side coils having different connection systems from each other and having the same phase as each other.

Therefore, the coil lead wires of the power supply side coils having the same phase of the first connection system A and the second connection system B can be collectively held at substantially the same position by the wire holding portion 675. As a result, it is possible to easily connect the coil lead wires to which the current having the same phase is supplied to the control device 100. The fact that "wire holding portion collectively holds the coil lead wire" includes that the plurality of coil lead wires are held by one wire holding portion.

The six coil lead wires 91Aa to 91Be held by each wire holding portion 675 are collectively disposed in a predetermined region. That is, the coil lead wires passed through the through-hole 656 of the bearing holder 655 are collectively disposed in a predetermined region. The predetermined region in the present modification example is one region AR (lower left in the drawing) of the four regions partitioned by the imaginary line L1 and the imaginary line L2 illustrated in FIG. 15. The connecting portion of the control device 100 can be disposed on an extension line of each coil lead wire 91Aa to 91Be extending in the axial direction. Therefore, the coil lead wires 91Aa to 91Be can be easily connected to the control device 100. In addition, in a case where the rotation sensor that detects the rotational position of the rotor 30 is provided in the control device 100, it is possible to reduce the influence on the sensing by the rotation sensor, as compared with the configuration in which the coil lead wires are disposed in a distributed manner. The fact that "a certain object is collectively disposed in a predetermined region" includes, for example, that a certain object is disposed in a region where the angle in the circumferential direction is 180 degrees or less in plan view.

As illustrated in FIGS. 12 and 13, the motor 610 is provided with an insulating portion 680. The insulating portion 680 is formed of an insulating material such as plastic or elastomer and extends along the circumferential direction. The insulating portion 680 is held by the bearing holder 655. More specifically, the insulating portion 680 is fitted and held inside the three through-holes 656 of the bearing holder 655. The insulating portion 680 surrounds the coil lead wires 91Aa to 91Be inside the through-hole 656. As a result, insulation between the coil lead wires 91Aa to 91Be passing through the through-hole 656 and the bearing holder 655 can be ensured.

In addition, the inner diameter of the through-hole 656 is larger than the wire diameter of the coil lead wires 91Aa to 91Be. Therefore, the coil lead wires 91Aa to 91Be can be easily passed through the through-hole 656 at the time of assembling the motor. In addition, since the coil lead wire and the inner peripheral surface of the through-hole are positioned apart from each other, insulation between the coil lead wire and the bearing holder 655 can be easily ensured.

In addition, when the coil lead wires 91Aa to 91Be only pass through the through-hole 656, since the tip end side is not constrained, there is a possibility that the coil lead wires collapse when receiving an external force and the position is shifted. However, in this modification example, the insulating portion 680 is interposed between the coil lead wires 91Aa to 91Be and the through-hole 656 and is held by the bearing holder 655. Therefore, the coil lead wires 91Aa to 91Be can be held with respect to the bearing holder 655 with high accuracy. In other words, the insulating portion 680 can suppress the positional shift of the coil lead wires 91Aa to 91Be. In addition, even in a case where the coil lead wires 91Aa to 91Be are shifted from a predetermined position, by adjusting the position of the insulating portion 680, the coil lead wires 91Aa to 91Be can be moved to the predetermined position. As a result, the coil lead wires 91Aa to 91Be can be easily connected to the control device 100 at the time of assembling the motor 610.

The insulating portion 680 has a plurality of holes 680a. In FIG. 12, the number of holes 680a is six. The hole 680a penetrates the insulating portion 680 in the axial direction. In the hole 680a, the coil lead wires 91Aa to 91Be are passed through, respectively. A portion protruding upward from the insulating portion 680 in the coil lead wires 91Aa to 91Be is connected to the control device 100. In this modification example, the insulating portion 680 is a separate member from the wire support member 670.

In a state where the bearing holder 655 is attached and the coil lead wires 91Aa to 91Be are passed through the through-hole 656, the insulating portion 680 is fitted into the through-hole 656 from above. In this case, bending of the coil lead wires 91Aa to 91Be can be suppressed as compared with the case where the bearing holder 655 is attached after the coil lead wires 91Aa to 91Be are passed through the insulating portion 680.

In addition, the insulating portion 680 is fitted into the through-hole 656, so that the gap between the coil lead wire and the through-hole 656 disappears and the through-hole 656 is sealed with the insulating portion 680. Therefore, it is possible to prevent dust and the like from flowing from the outside of the motor 610 into the inside of the motor. There may be a gap between the insulating portion 680 and the inner side surface of the through-hole 656.

Instead of the holding recessed portion 675d, the wire holding portion 675 may have the through-hole that holds the coil lead wire and penetrates in the axial direction.

Figure 17:
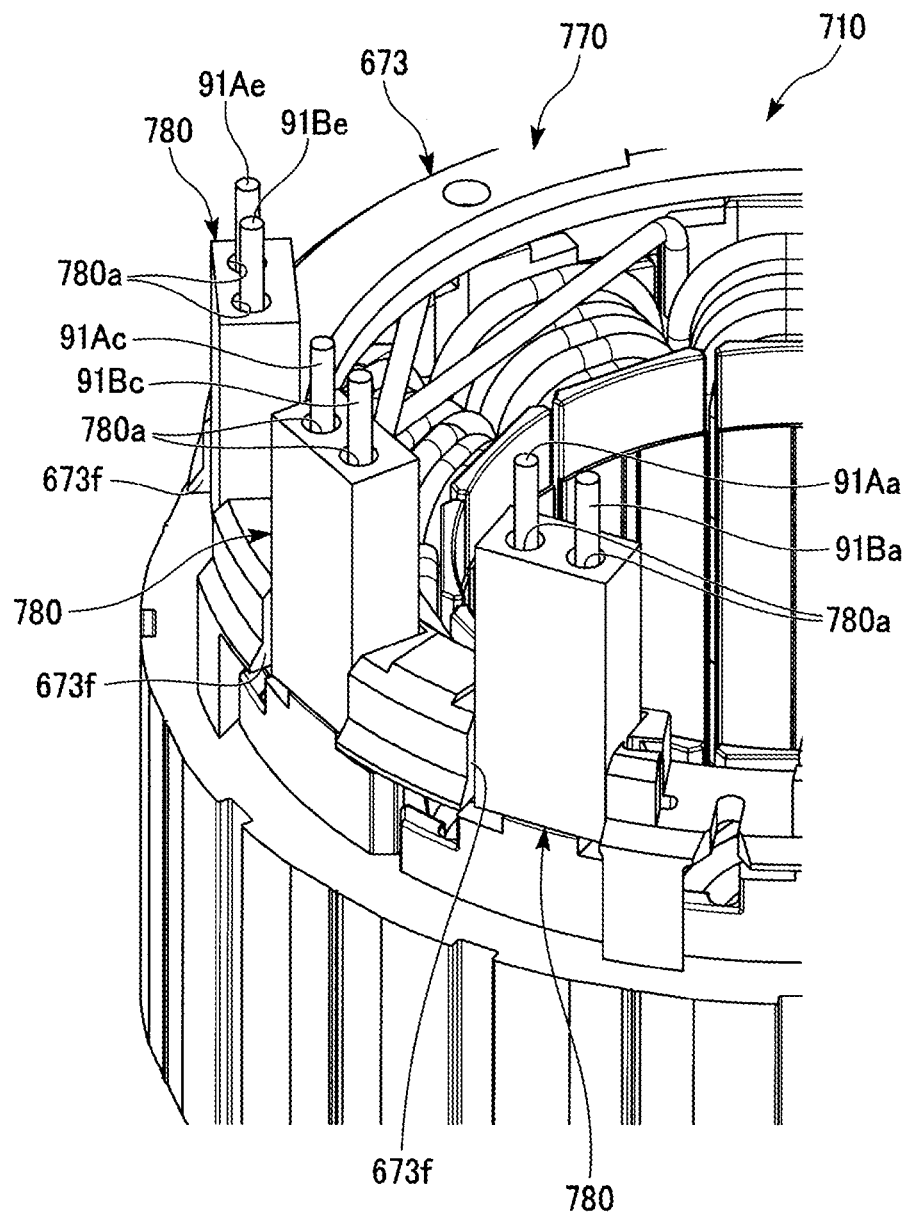
FIG. 17 is a perspective view illustrating a portion of a motor according to Modification Example 7 of the preferred embodiment.

A motor 710 of this modification example has a plurality of insulating portions 780. In FIG. 17, the number of the insulating portions 780 is three. The insulating portion 780 is different from the insulating portion 680 of the motor 610 according to Modification Example 6. As illustrated in FIG. 17, the insulating portion 780 is rectangular parallelepiped extending in the axial direction. The insulating portion 780 is held by the wire support member 770. The upper end of the insulating portion 680 is positioned above the through-hole 656 (not illustrated). The upper end of the insulating portion 680 may be positioned within the through-hole 656. The insulating portion 780 is disposed at a plurality of second recessed portions 673f of the main body portion 673. That is, each insulating portion 780 is fitted into each second recessed portion 673f and held by the wire support member 770. The insulating portion 780 is a separate member from the wire support member 770.

The insulating portion 780 has a plurality of holding holes 780a respectively. The holding hole 780a penetrates the insulating portion 780 in the axial direction and the coil lead wires 91Aa to 91Be are passed through. In FIG. 17, the number of holding holes 780a of each insulating portion 780 is two in each. With such a configuration, since the insulating portion 780 can be attached to the wire support member 770 before the bearing holder 655 is attached, the insulating portion 780 can be easily attached to the motor 710.

Since the coil lead wires 91Aa to 91Be are passed through the holding hole 780a of the insulating portion 780, the coil lead wires 91Aa to 91Be held by the wire holding portion 675 are further hardly disengaged. In addition, since the insulating portion 780 covers the tip end side of the coil lead wires 91Aa to 91Be, the positional shift of the coil lead wires 91Aa to 91Be is unlikely to occur.

In this modification example, the plurality of insulating portions 780 may be configured to include one member having the plurality of holding holes 780a.

Figure 18:
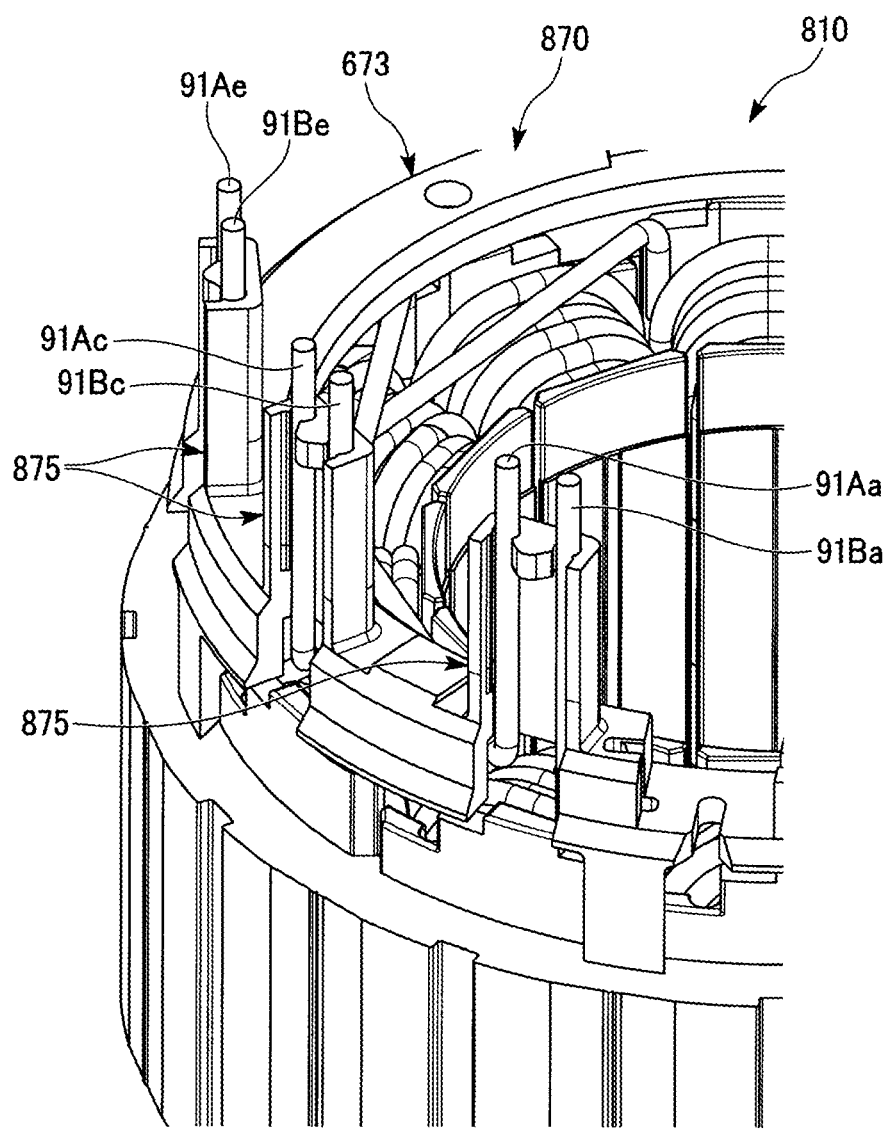
FIG. 18 is a perspective view illustrating a portion of a motor according to Modification Example 8 of the preferred embodiment.

A motor 810 of this modification example is obtained by modifying the insulating portion 680 and the wire holding portion 675 of the motor 610 of Modification Example 6. As illustrated in FIG. 18, in the motor 810 of this modification example, a wire holding portion 875 extends upward from the wire holding portion 675 illustrated in FIGS. 12 and 13. The upper end of the wire holding portion 875 is positioned inside the through-hole 656 of the bearing holder 655 or above the through-hole 656. The wire holding portion 875 surrounds the coil lead wires 91Aa to 91Be inside the through-hole 656. The wire holding portion 875 electrically insulates the coil lead wires 91Aa to 91Be from the bearing holder 655. That is, the wire holding portion 875 has a function as the insulating portion in the above modification example. In other words, in this modification example, the insulating portion is the wire holding portion 875.

In this modification example, the wire support member 870 is a single member. The wire holding portion 875 and the main body portion 673 are portions of a single member. In this manner, since the wire holding portion 875 serving as a portion of the wire support member 870 serving as a single member functions as an insulating portion, there is not necessary to separately provide an insulating portion, and the number of parts of the motor 810 can be reduced. Since the tip end side of the coil lead wires 91Aa to 91Be is held by the wire holding portion 875, the positional shift of the coil lead wires 91Aa to 91Be is unlikely to occur.

Figure 19:
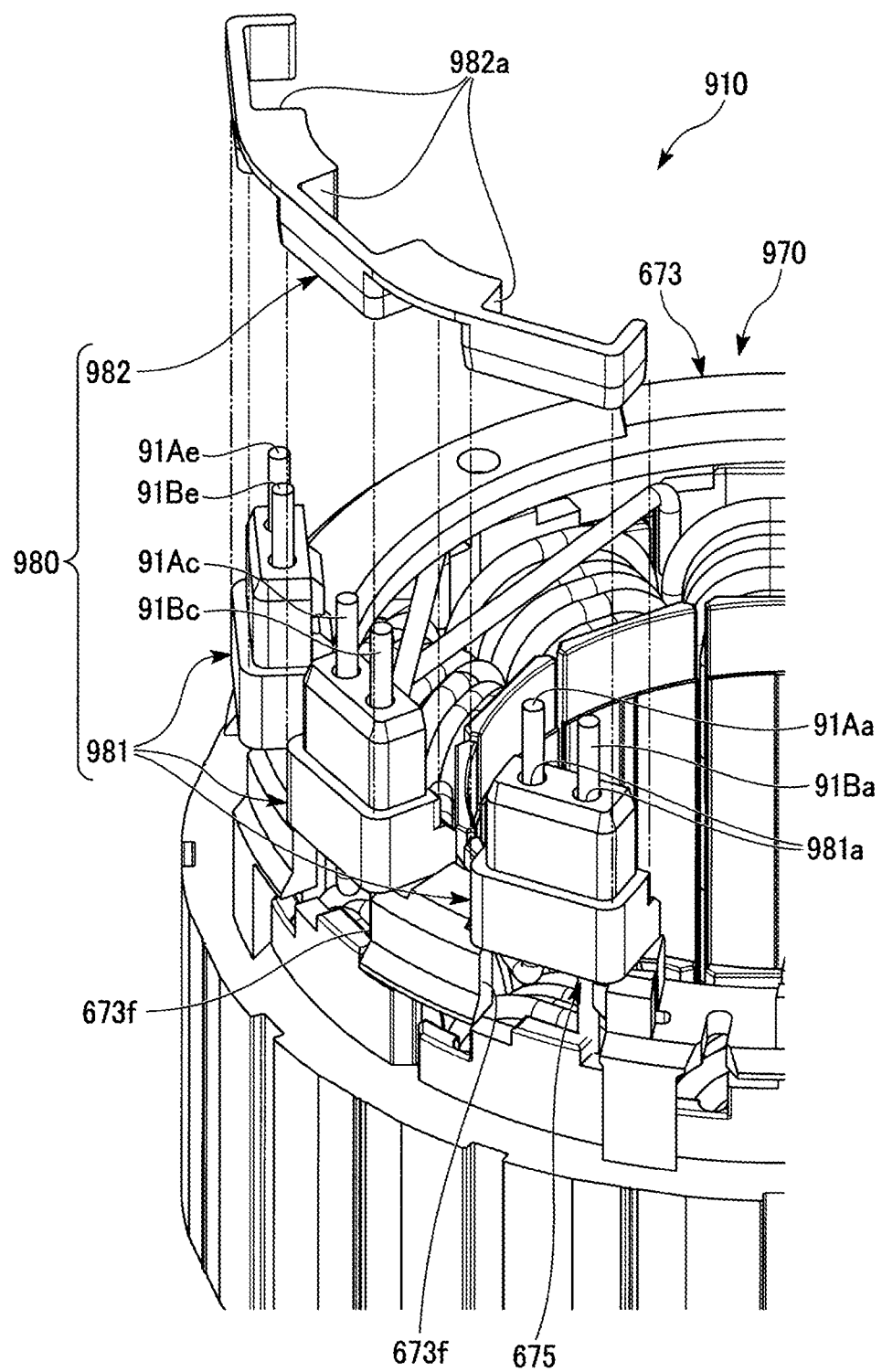
FIG. 19 is a perspective view illustrating a portion of a motor according to Modification Example 9 of the preferred embodiment.

A motor 910 of this modification example is obtained by modifying the insulating portion 680 of the motor 610 of Modification Example 6. The motor 910 has an insulating portion 980. As illustrated in FIG. 19, the insulating portion 980 has a plurality of first insulating members 981 and a second insulating member 982. The first insulating member 981 is held by the wire support member 970. The first insulating member 981 is provided on the upper surface of both end portions of the second recessed portion 673f in the wire holding portion 675 in the circumferential direction. The first insulating member 981 is a substantially rectangular parallelepiped member extending in the vertical direction. The first insulating member 981 has a step in which the dimension in the radial direction and the dimension in the circumferential direction are smaller upward from the lower side.

In FIG. 19, three first insulating members 981 are provided. Each first insulating member 981 penetrates the first insulating member 981 in the vertical direction, and has two holes 981a in each in which the coil lead wires 91Aa to 91Be are passed through. The coil lead wires 91Aa to 91Be are covered with the first insulating member 981. Therefore, the coil lead wires 91Aa to 91Be held by the wire holding portion 675 are less likely to be disengaged. The three first insulating members 981 may be a single member.

The second insulating member 982 is a member extending along the circumferential direction. The second insulating member 982 is held by the through-hole 656 of the bearing holder 655 and attached to the first insulating member 981. The second insulating member 982 has three fitting portions 982a recessed outward the radial direction from the inner side in the radial direction. The upper portion of the first insulating member 981 is fitted into the fitting portion 982a. The lower end of the second insulating member 982 is in contact with a stepped surface orthogonal to the axial direction in a step of the first insulating member 981 from above. As a result, the second insulating member 982 is attached to each first insulating member 981 and connects the plurality of first insulating members 981 to each other. The second insulating member 982 is a separate member from the first insulating member 981.

As a result, the relative position between the first insulating member 981 and the second insulating member 982 can be finely adjusted. That is, the positional shift occurring in each portion is absorbed by adjusting the relative position between the first insulating member 981 and the second insulating member 982, so that the arrangement accuracy of the coil lead wires 91Aa to 91Be can be improved. Even when the relative positions of each coil lead wire 91Aa to 91Be are shifted, by adjusting the relative position between the first insulating member 981 and the second insulating member 982 connected to each other, the positional shift of each coil lead wire 91Aa to 91Be can be corrected. In addition, even in a case where external forces are applied to each coil lead wire 91Aa to 91Be, since the first insulating member 981 and the second insulating member 982 are connected to each other, it is possible to prevent the positions of each coil lead wire 91Aa to 91Be from shifting. Therefore, in a state where the position accuracy of the coil lead wires 91Aa to 91Be is increased, it is possible to allow the coil lead wires to protrude upward from the through-hole 656 of the bearing holder 655. Therefore, it is possible to connect the coil lead wires 91Aa to 91Be to the control device 100 with high accuracy.

Since the second insulating member 982 is held by the through-hole 656, the first insulating member 981 and the second insulating member 982 seal the through-hole 656. However, similar to Modification Example 6, there may be a gap between the first insulating member 981 and the inner side surface of the through-hole 656, and there may be a gap between the second insulating member 982 and the inner side surface of the through-hole 656.

Although a motor of this modification example is obtained by modifying the insulating portion 980 of the motor 910 according to Modification Example 9, since the modification is small, it will be described with reference to FIG. 19. In the motor 910 of Modification Example 9, the first insulating member 981 is attached to the wire holding portion 675. On the other hand, in this modification example, the wire holding portion 675 is formed as a separate member from the wire support member 970, and the function of the wire holding portion 675 is allowed to serve also as the first insulating member 981. That is, in this modification example, in the wire support member 970, an opening penetrating in the axial direction is provided in a portion of the main body portion 673. From the opening of the main body portion 673, the coil lead wires 91Aa to 91Be are drawn out in the axial direction. The drawn out coil lead wires 91Aa to 91Be are passed through the hole 981a of the first insulating member 981. The first insulating member 981 and the main body portion 673 are fixed to each other by fastening unit respectively provided. In the second insulating member 982, the fitting portion 982a is fitted into the first insulating member 981. By attaching the first insulating member 981, the coil lead wires 91Aa to 91Be are held by the first insulating member 981 and can be adjusted to a predetermined position. Furthermore, by adjusting the position of the second insulating member 982, the positions of the coil lead wires 91Aa to 91Be can be further adjusted via each first insulating member 981. The three first insulating members may be a single member.

The function and effect of the wire support member described above is an effect that can be obtained even in a case where the conducting member is not provided except for the function and effect according to the conducting member.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
   a rotor that includes a shaft with a central axis extending in a vertical direction as a center;
   a stator opposing the rotor in a radial direction;
   a bearing that supports the shaft;
   a wire support member above the stator; and
   a bearing holder above the wire support member to hold the bearing, wherein the stator includes:
   a plurality of teeth, and
   a plurality of coils provided on the plurality of teeth, the plurality of coils including neutral point side coils, the wire support member includes:
cutouts that partially surround coil lead wires of the neutral point side coils,
a neutral point bus bar that includes plate-shaped members which have surfaces extending in parallel to the central axis, the neutral point bus bar electrically connects the coil lead wires of the neutral point side coils to each other, and
a main body portion that supports the neutral point bus bar in a groove portion of the main body portion,
the groove portion is defined by division groove portions that hold the neutral point bus bar, the division groove portions are provided at intervals along a circumferential direction of the main body portion,
a first recessed portion is provided between adjacent ones of the division groove portions in the circumferential direction,
the bearing holder includes a through-hole that penetrates the bearing holder in an axial direction, and at least one coil end of at least one of the plurality of coils passes through the through-hole to extend upward through the bearing holder,
the plurality of coils further include a plurality of power supply side coils where only the plurality of power supply side coils comprise the at least one coil end extending through the through-hole, and
the plurality of power supply side coils are positioned adjacent to each other.

2. The motor according to claim 1,
wherein the main body portion includes a a wire holding portion with a second recessed portion which opens inward in the radial direction, and
the second recessed portion opposes at least a portion of the at least one coil end extending through the through-hole via a gap in the axial direction.

3. The motor according to claim 1,
wherein the plurality of coils define a plurality of connection systems of different phases,
the wire support member includes wire holding portions which collectively hold the coil lead wires corresponding to the plurality of connection systems of different phases.

4. The motor according to claim 1,
wherein the wire support member includes a wire holding portion which includes a holding recessed portion in which a coil lead wire of one of the plurality of coils is held, and
the holding recessed portion opens in the radial direction.

5. The motor according to claim 4,
wherein the holding recessed portion opens outward in the radial direction.

6. The motor according to claim 1, further comprising:
an insulating portion that surrounds the at least one coil end of at least one of the plurality of coils passing through the through-hole.

7. The motor according to claim 6,
wherein the insulating portion is held by the bearing holder.

8. The motor according to claim 6,
wherein the insulating portion is held by the wire support member.

9. The motor according to claim 6,
wherein the insulating portion is a wire holding portion of the wire support member.

10. The motor according to claim 6,
wherein the insulating portion includes
a first insulating member held by the wire support member, and
a second insulating member that is a separate member from the first insulating member, held by the bearing holder, and attached to the first insulating member.

11. The motor according to claim 10,
wherein the insulating portion includes a plurality of first insulating members, and
the second insulating member connects the plurality of first insulating members to each other.

12. The motor according to claim 1,
wherein a plurality of coil lead wires of the plurality of coils are collectively arranged in a predetermined region.

13. The motor according to claim 1,
wherein the main body portion includes
a protrusion portion that protrudes from an inner side surface of at least one of the division groove portions in a direction perpendicular to the axial direction, and presses the neutral point bus bar.

14. The motor according to claim 13,
wherein the main body portion includes a hole that penetrates the main body portion in the axial direction, and at least a portion thereof overlaps the protrusion portion in plan view.

15. The motor according to claim 1,
wherein the plurality of coils define a first connection system and a second connection system, and
two of the neutral point bus bars are provided, the two of the neutral point bus bars includes a first neutral point bus bar that connects coil lead wires of the first connection system to each other and a second neutral point bus bar that connects the coil lead wires of the second connection system to each other.

* * * * *